United States Patent
Sorrell et al.

(10) Patent No.: US 9,527,775 B2
(45) Date of Patent: Dec. 27, 2016

(54) PERCOLATED MULLITE AND A METHOD OF FORMING SAME

(71) Applicants: NEWSOUTH INNOVATIONS PTY LIMITED, University of New South Wales, Sydney, New South Wales (AU); VECOR IP HOLDINGS LIMITED, Central, Hong Kong (CN)

(72) Inventors: Charles Christopher Sorrell, Randwick (AU); Pramod Koshy, Randwick (AU); Sandor Koszo, Hebi (CN)

(73) Assignee: VECOR IP HOLDINGS LIMITED, Hong Kong (CN)

( * ) Notice: Subject to any disclaimer, the term of this patent is extended or adjusted under 35 U.S.C. 154(b) by 0 days.

(21) Appl. No.: 14/362,351

(22) PCT Filed: Dec. 7, 2012

(86) PCT No.: PCT/AU2012/001500
§ 371 (c)(1),
(2) Date: Jun. 2, 2014

(87) PCT Pub. No.: WO2013/082670
PCT Pub. Date: Jun. 13, 2013

(65) Prior Publication Data
US 2015/0344371 A1    Dec. 3, 2015

(30) Foreign Application Priority Data
Dec. 9, 2011   (AU) ............................... 2011905129

(51) Int. Cl.
*C04B 35/185* (2006.01)
*C04B 35/64* (2006.01)
(Continued)

(52) U.S. Cl.
CPC .......... *C04B 35/185* (2013.01); *C04B 35/107* (2013.01); *C04B 35/19* (2013.01); *C04B 35/195* (2013.01);
(Continued)

(58) Field of Classification Search
CPC ............... C04B 2235/3463; C04B 2235/3472; C04B 35/185
See application file for complete search history.

(56) References Cited

U.S. PATENT DOCUMENTS 3,336,108 A * 8/1967 Miller, Jr. ............... C01B 33/26
423/327.1
3,642,505 A * 2/1972 Bakker ................. C04B 35/185
501/128

(Continued)

FOREIGN PATENT DOCUMENTS

GB          716265 A      9/1954
WO    WO 92/11219 A1     7/1992

OTHER PUBLICATIONS

International Search Report for corresponding PCT/AU2012/001500, completed Feb. 5, 2013 by Edgar Torres of the APO.
(Continued)

*Primary Examiner* — Noah Wiese
(74) *Attorney, Agent, or Firm* — Tarolli, Sundheim, Covell & Tummino LLP

(57) ABSTRACT

A method of producing percolated mullite in a body of material, the method including the step of heating the body of material, wherein the body of material has a composition that includes alumina and silica, and the weight ratio of alumina:silica is from approximately 10:90 to approximately 77:23. The percolated mullite produced extends continuously and/or substantially throughout the entire body of material.

24 Claims, 58 Drawing Sheets

(51) Int. Cl.
*C04B 35/66* (2006.01)
*C04B 35/19* (2006.01)
*C04B 35/195* (2006.01)
*C04B 35/622* (2006.01)
*C04B 35/653* (2006.01)
*C04B 35/657* (2006.01)
*C04B 35/107* (2006.01)

(52) U.S. Cl.
CPC ......... *C04B 35/62204* (2013.01); *C04B 35/64* (2013.01); *C04B 35/653* (2013.01); *C04B 35/657* (2013.01); *C04B 35/66* (2013.01); C04B 2235/3201 (2013.01); C04B 2235/3205 (2013.01); C04B 2235/3206 (2013.01); C04B 2235/3208 (2013.01); C04B 2235/3224 (2013.01); C04B 2235/349 (2013.01); C04B 2235/444 (2013.01); C04B 2235/5228 (2013.01); C04B 2235/6567 (2013.01); *Y10T 428/249921* (2015.04)

(56) References Cited

U.S. PATENT DOCUMENTS 5,173,349 A * 12/1992 Yavuz ................... B01J 21/12
428/116
7,425,297 B2 * 9/2008 Saha ..................... C04B 26/285
264/629

OTHER PUBLICATIONS

Sultana, et al.: "*Mullite Formation in Coal Fly Ash is Facilitated by the Incorporation of Magnesium Oxide*"; Rev.Adv.Master.Sci., 2011, vol. 27, pp. 69-74. (see ISR).

* cited by examiner

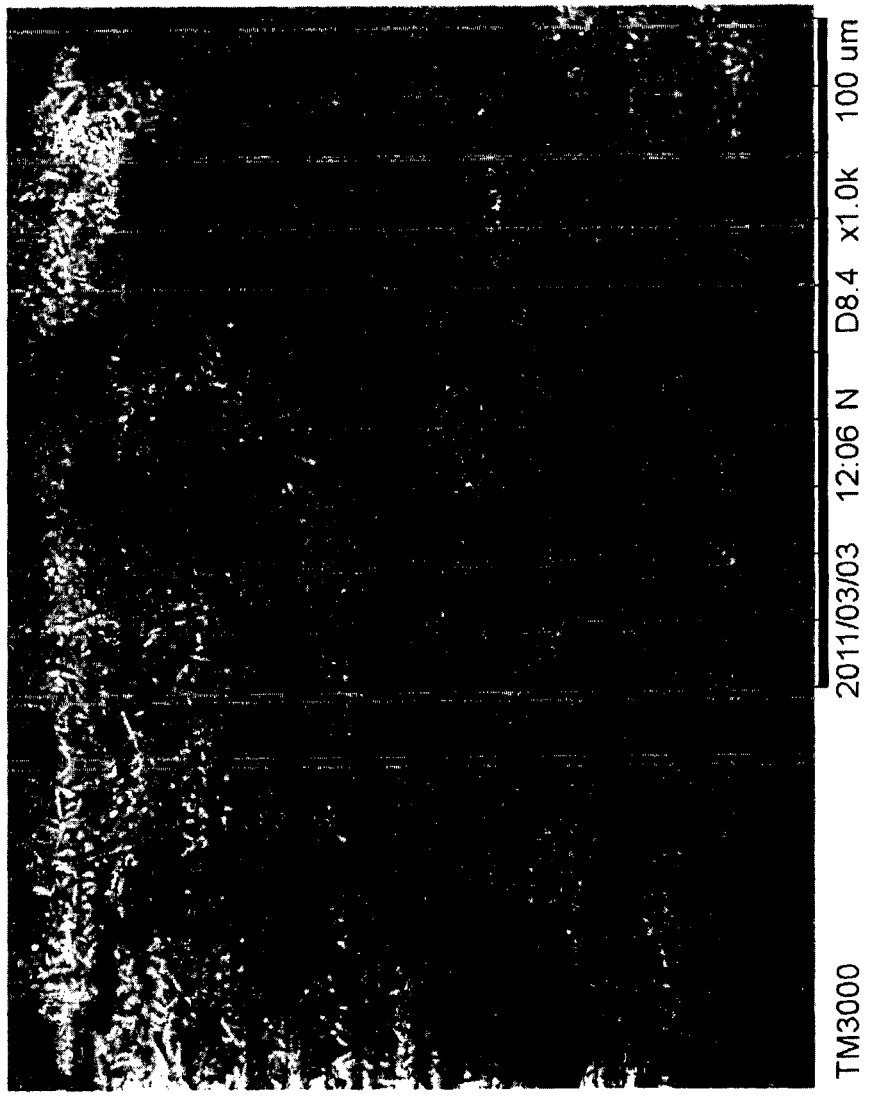

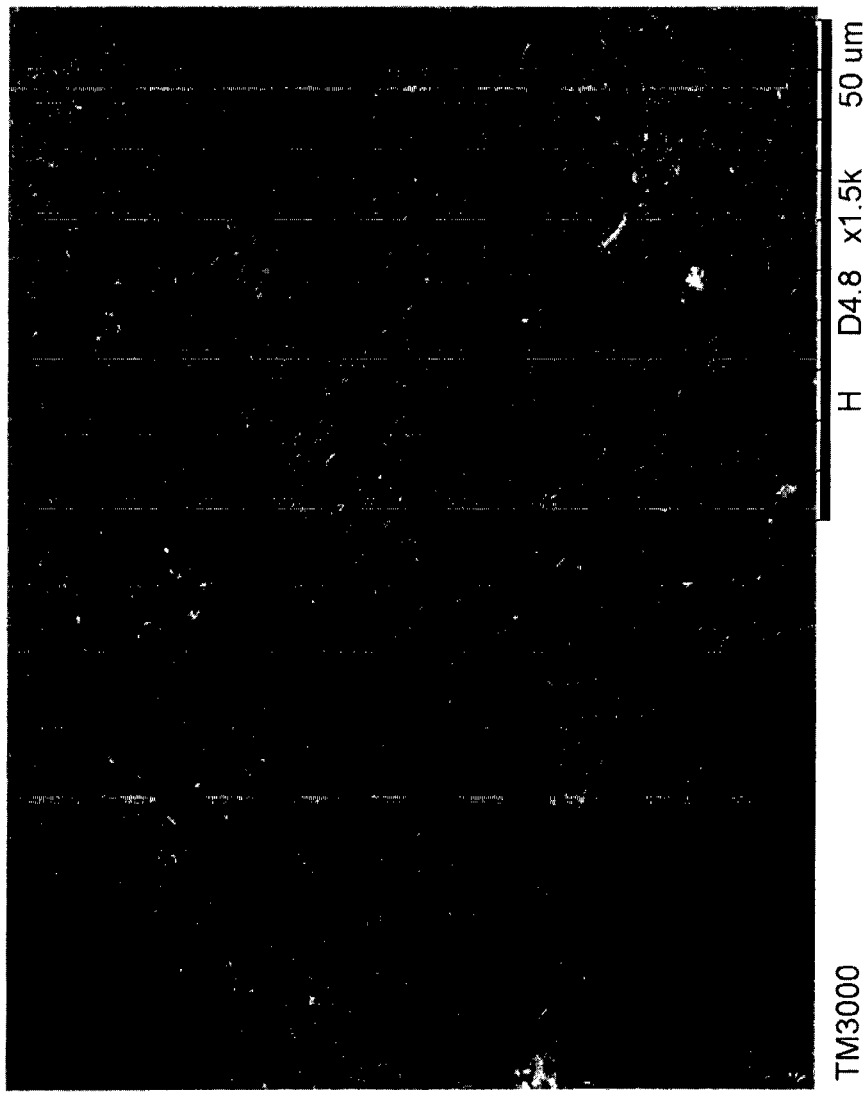

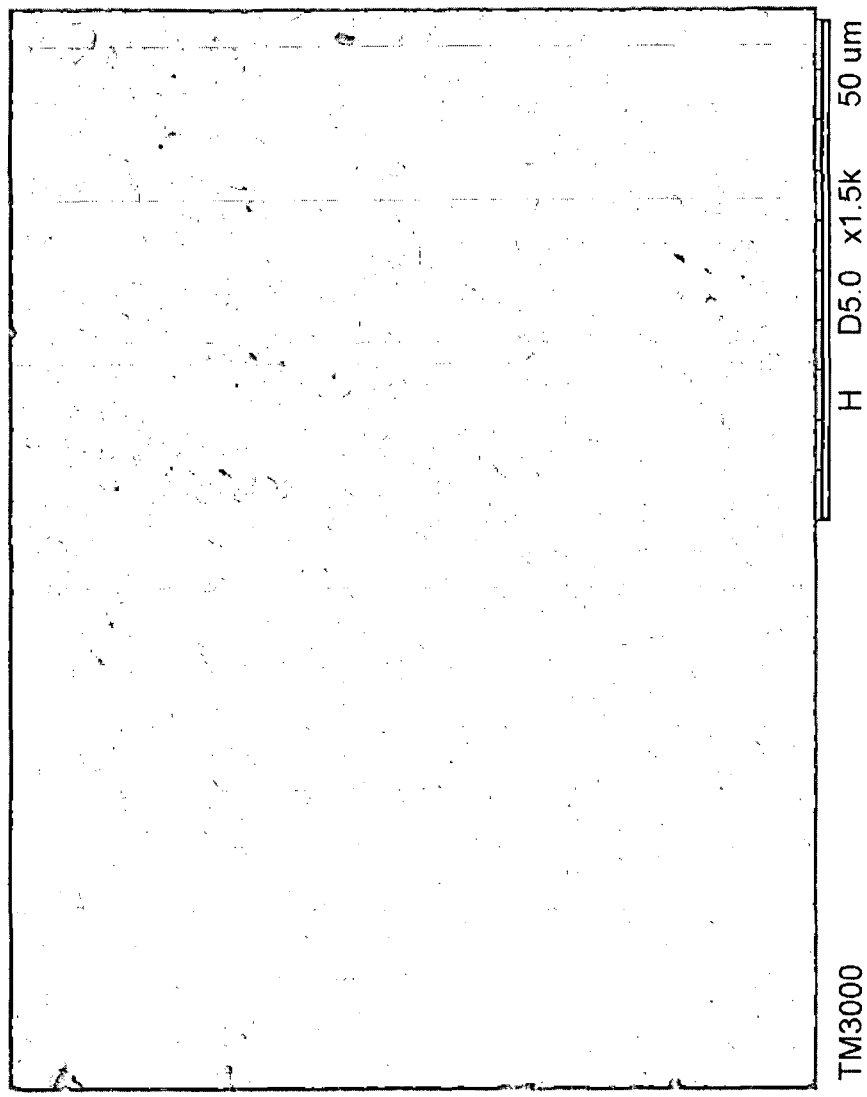

DATA SET 1

Microstructural area considered = 160 μm x 120 μm

| Sintering Time (h) | 1 | 2 | 4 | 24 | 96 |
|---|---|---|---|---|---|
| Number of Fibres | 1833 | 1355 | 684 | 631 | 492 |
| % of Fibres | Fibre Length in μm (Number of Fibres) | | | | |
| D0 | 0.61 | 0.79 | 1.78 | 2.26 | 1.78 |
| D10 | 1.67 (183.3) | 1.99 (135.5) | 2.66 (68.4) | 3.55 (63.1) | 3.55 (49.2) |
| D20 | 2.17 (366.7) | 2.44 (271.0) | 3.24 (136.8) | 4.38 (126.2) | 4.38 (98.4) |
| D30 | 2.47 (549.9) | 2.83 (406.5) | 3.69 (205.2) | 5.11 (189.3) | 5.09 (147.6) |
| D40 | 2.78 (733.2) | 3.23 (542.0) | 4.16 (273.6) | 5.82 (252.4) | 5.82 (196.8) |
| D50 | 3.11 (916.5) | 3.62 (677.5) | 4.71 (342.0) | 6.71 (315.5) | 6.71 (246.0) |
| D60 | 3.50 (1099.8) | 3.99 (813.0) | 5.30 (410.4) | 7.80 (378.6) | 7.80 (295.2) |
| D70 | 3.90 (1283.1) | 4.78 (948.5) | 5.94 (478.8) | 9.23 (441.7) | 9.25 (344.4) |
| D80 | 4.59 (1466.4) | 5.72 (1084.0) | 6.96 (547.2) | 11.18 (504.8) | 11.20 (393.6) |
| D90 | 5.66 (1649.7) | 7.23 (1219.5) | 8.91 (615.6) | 14.81 (567.9) | 15.07 (442.8) |
| D100 | 23.59 | 46.49 | 40.01 | 32.40 | 78.85 |
| Average Length (μm) | 3.94 | 4.32 | 5.98 | 7.45 | 9.03 |
| Areal Distribution (Fibre % of Matrix) | 60.60 | 68.15 | 84.55 | 92.70 | 96.10 |

Heating rate 150°C/hour

Heating the fly ash for 4 h at 1500°C led to: ~85% mullite + ~15% glass + pores

Heating the fly ash for 96 h at 1500°C led to: ~95% mullite + ~5% glass + pores

Figure 18

DATA SET 2

Microstructure Area Considered = 100 μm x 75 μm

| Soak Time (h) | 2 | 4 | 8 | 12 | 24 |
|---|---|---|---|---|---|
| Number of Fibres | 3644 | 1951 | 1663 | 1279 | 1112 |
| % of Fibres | Fibre Length in μm | | | | |
| D0 | 0.17 | 0.24 | 0.68 | 0.68 | 0.85 |
| D10 | 0.55 | 1.18 | 0.74 | 1.55 | 1.72 |
| D20 | 0.70 | 1.39 | 1.05 | 1.78 | 2.05 |
| D30 | 0.80 | 1.52 | 1.21 | 2.03 | 2.37 |
| D40 | 0.93 | 1.67 | 1.36 | 2.24 | 2.61 |
| D50 | 1.05 | 1.79 | 1.44 | 2.42 | 2.98 |
| D60 | 1.18 | 1.94 | 1.71 | 2.69 | 3.30 |
| D70 | 1.30 | 2.17 | 2.02 | 3.03 | 3.82 |
| D80 | 1.40 | 2.59 | 2.33 | 3.59 | 4.63 |
| D90 | 1.71 | 3.30 | 3.08 | 4.51 | 5.76 |
| D100 | 11.91 | 12.44 | 13.74 | 15.25 | 23.01 |
| Average Length (μm) | 1.16 | 2.10 | 2.33 | 2.86 | 3.49 |
| Areal Distribution (Fibre % of Matrix) | 24.82 | 60.10 | 83.74 | 77.17 | 65.24 |

Figure 19

DATA SET 3

Microstructure Area Considered = 100 μm x 75 μm

| Soak Time (h) | 2 | 4 | 8 | 12 | 24 |
|---|---|---|---|---|---|
| Number of Fibres | 1374 | 1150 | 926 | 710 | 551 |
| % of Fibres | Fibre Length in μm | | | | |
| D0 | 0.54 | 0.87 | 1.20 | 1.37 | 1.20 |
| D10 | 1.17 | 1.29 | 1.84 | 1.53 | 1.65 |
| D20 | 1.34 | 1.65 | 2.19 | 2.04 | 2.15 |
| D30 | 1.56 | 1.96 | 2.35 | 2.24 | 2.40 |
| D40 | 1.76 | 2.29 | 2.54 | 2.46 | 2.71 |
| D50 | 1.92 | 2.51 | 2.74 | 2.68 | 2.99 |
| D60 | 2.29 | 2.79 | 2.93 | 2.88 | 3.37 |
| D70 | 2.62 | 3.10 | 3.27 | 3.16 | 3.77 |
| D80 | 3.24 | 3.52 | 3.66 | 3.57 | 4.32 |
| D90 | 4.14 | 3.94 | 4.16 | 3.88 | 5.36 |
| D100 | 13.62 | 7.24 | 7.83 | 6.74 | 11.94 |
| Average Length (μm) | 2.39 | 2.72 | 2.94 | 2.81 | 3.39 |
| Areal Distribution (Fibre % of Matrix) | 60.90 | 75.12 | 72.61 | 58.99 | 55.67 |

Figure 20

DATA SET 4

Microstructure Area Considered = 100 μm x 75 μm

| Soak Time (h) | 2 | 4 | 8 | 12 | 24 |
|---|---|---|---|---|---|
| Number of Fibres | 1248 | 1017 | 849 | 766 | 508 |
| % of Fibres | Fibre Length in μm | | | | |
| D0 | 0.34 | 0.54 | 0.85 | 1.03 | 1.07 |
| D10 | 1.07 | 0.72 | 1.72 | 1.72 | 2.16 |
| D20 | 1.29 | 1.34 | 2.06 | 2.09 | 2.48 |
| D30 | 1.51 | 1.62 | 2.22 | 2.29 | 2.78 |
| D40 | 1.69 | 1.79 | 2.43 | 2.46 | 3.06 |
| D50 | 1.86 | 1.99 | 2.59 | 2.66 | 3.28 |
| D60 | 2.05 | 2.19 | 2.76 | 2.82 | 3.36 |
| D70 | 2.38 | 2.37 | 2.93 | 2.99 | 3.81 |
| D80 | 2.77 | 2.65 | 3.19 | 3.33 | 4.31 |
| D90 | 3.39 | 3.42 | 3.69 | 3.89 | 5.64 |
| D100 | 12.62 | 7.62 | 10.99 | 12.01 | 14.14 |
| Average Length (μm) | 2.16 | 2.53 | 2.70 | 2.83 | 3.60 |
| Areal Distribution (Fibre % of Matrix) | 44.95 | 73.93 | 78.23 | 74.59 | 67.67 |

Figure 21

DATA SET 5

Microstructure Area Considered = 100 μm × 75 μm

| Soak Time (h) | 2 | 4 | 8 | 12 | 24 |
|---|---|---|---|---|---|
| Number of Fibres | 1178 | 602 | 462 | 379 | 424 |
| % of Fibres | | | Fibre Length in μm | | |
| D0 | 0.41 | 1.04 | 1.04 | 1.24 | 1.24 |
| D10 | 0.47 | 1.39 | 1.51 | 1.67 | 2.29 |
| D20 | 0.98 | 1.76 | 2.01 | 2.09 | 2.65 |
| D30 | 1.18 | 2.07 | 2.18 | 2.29 | 2.99 |
| D40 | 1.31 | 2.29 | 2.35 | 2.49 | 3.33 |
| D50 | 1.45 | 2.46 | 2.49 | 2.69 | 3.66 |
| D60 | 1.65 | 2.65 | 2.65 | 2.79 | 3.99 |
| D70 | 1.78 | 2.85 | 2.85 | 2.99 | 4.64 |
| D80 | 1.98 | 3.13 | 3.02 | 3.41 | 5.61 |
| D90 | 2.85 | 3.67 | 3.55 | 3.83 | 6.68 |
| D100 | 10.06 | 7.24 | 5.24 | 5.49 | 14.18 |
| Average Length (μm) | 1.61 | 2.54 | 2.51 | 2.67 | 4.21 |
| Areal Distribution (Fibre % of Matrix) | 62.57 | 58.99 | 52.94 | 80.58 | 78.62 |

Figure 22

DATA SET 6

Microstructure Area Considered = 100 μm × 75 μm

| Soak Time (h) | 2 | 4 | 8 | 12 | 24 |
|---|---|---|---|---|---|
| Number of Fibres | 894 | 669 | 489 | 434 | 531 |
| % of Fibres | Fibre Length in μm | | | | |
| D0 | 0.70 | 0.17 | 0.76 | 1.04 | 0.38 |
| D10 | 1.31 | 0.64 | 1.34 | 1.48 | 0.87 |
| D20 | 1.65 | 1.17 | 1.73 | 1.96 | 1.36 |
| D30 | 1.98 | 1.56 | 2.09 | 2.15 | 1.73 |
| D40 | 2.18 | 1.96 | 2.23 | 2.32 | 2.12 |
| D50 | 2.35 | 2.21 | 2.38 | 2.51 | 2.38 |
| D60 | 2.51 | 2.40 | 2.51 | 2.68 | 2.62 |
| D70 | 2.68 | 2.57 | 2.68 | 2.87 | 2.90 |
| D80 | 2.85 | 2.76 | 2.85 | 3.10 | 3.46 |
| D90 | 3.13 | 2.99 | 2.96 | 3.71 | 4.30 |
| D100 | 7.83 | 5.44 | 11.74 | 5.75 | 9.86 |
| Average Length (μm) | 2.29 | 1.98 | 2.26 | 2.54 | 2.49 |
| Areal Distribution (Fibre % of Matrix) | 49.77 | 57.13 | 50.48 | 30.86 | 71.29 |

Figure 23

PERCOLATED MULLITE AND A METHOD OF FORMING SAME

RELATED APPLICATIONS

The invention is a 371 of international application number PCT/AU2012/001500, filed on 7 Dec. 2012, the entirety of which is incorporated herein by reference.

FIELD OF THE INVENTION

The present invention relates to percolated mullite and a method of forming same.

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Pure mullite has a melting point (and decomposition temperature) of ~1850° C. and as such, mullite often is used as a refractory material. In practice, however, commercial mullite refractory products always contain glass as a residual product of the raw materials and processing. The glass component typically resides between the mullite grains and assists in bonding the grains together. Accordingly, as the glass softens (at ~1200° C.), the mullite refractory material begins to deform by viscous flow when heated at or above this temperature (approximating the glass transition temperature). In seeking to address the issue of glass softening, conventional approaches to the formation of mullite tend to focus on the minimisation of the glass-forming components and fluxes in the starting material for commercial mullite formation.

SUMMARY OF THE INVENTION

In one broad from the present invention provides, a method of producing percolated mullite in a body of material, the method including the step of heating the body of material, wherein the body of material has a composition that includes alumina and silica, and the weight ratio of alumina:silica is from approximately 10:90 to approximately 77:23.

In one form, the percolated mullite produced extends continuously and/or substantially throughout the entire body of material.

In another form, the composition includes an alumina:silica weight percent ratio of from approximately 24:76 to approximately 48:52.

In one form, the body includes pre-existing mullite.

In another form, the body does not include pre-existing mullite, but mullite forms on heating of the body.

In one form, the body includes a pre-existing glass component.

In another form, the body does not include a pre-existing glass component, but glass forms on heating of the body.

In a further form, the body does not include a pre-existing glass component, but glass is added.

In another form, the composition includes at least one flux.

In another form, the at least one flux is an oxide and/or salt of an alkali, alkaline earth, transition metal or lanthanide, or a semimetal oxide, metalloid oxide, or a halogen.

In one form, the body is heated to a temperature sufficient to soften the glass component.

In another form, the body is heated at a temperature sufficient to facilitate chemical diffusion through the softened glass.

In a further form, the body is heated at a temperature above the glass transition temperature of the glass component.

In another form, the body is heated at a temperature such that the glass is deformable and growth of the mullite fibres is not hindered physically or volumetrically by the glass.

In another form, the composition of the body includes a naturally occurring raw material and/or a synthetic raw material capable of forming mullite when heated.

In a further form, the composition of the body includes one or more materials selected from the group including kyanite, sillimanite, andalusite, topaz, pyrophyllite, clay, bauxite, quartz, or red mud.

In one form, the body is comprised principally of fly ash.

In one form, the composition further includes at least one aluminous raw material.

In one form, the at least one aluminous raw material is bauxite, alumina, an aluminium hydrate, or red mud.

In another form, the composition further includes at least one flux added extrinsically in addition to those present intrinsically.

In one form, the at least one flux is an oxide and/or salt of an alkali, alkaline earth, transition metal or lanthanide, or a semimetal oxide, metalloid oxide, or a halogen.

In another form, the body is heated at a temperature of between approximately 1400° C. and approximately 1600° C. for a period of time.

In one form, the body is heated at a temperature of at least 1500° C.

In one form, the period of time is greater than or equal to 2 hours.

In another form, the period of time is greater than or equal to 4 hours.

In another form, the period of time is greater than or equal to 8 hours.

In one form, the method includes sintering the body of material without a mould.

In another form, the method includes fuse-casting the body of material in a mould.

In one form, the body of material is heated at a temperature sufficient to allow rapid (liquid, notviscous) flow into the mould but no higher than 1850° C.

In one form, the percolated mullite is produced in the body such that a 3-3 composite material is formed.

In another form, the percolated mullite is produced in the body such that a 0-3 composite material is formed.

In a further form, the method further includes the step of leaching with a solvent to remove residual glass.

In one form, the present invention provides percolated mullite produced in accordance with the methods as described above.

In another form, the present invention provides use of the percolated mullite as described above in a refractory shape, refractory castable, refractory ramming mix, refractory crucible, refractory setter, refractory tube, refractory plate, refractory grain, refractory aggregate, kiln shelving, kiln post, heat shield, fibre blanket, fibre board, fibre shape, fuse-cast shape, corrosion resistant shape, coating, whiteware, sanitaryware, dinnerware, wear-resistant tile, military armour, proppant, corrosion-resistant shape, glass-ceramic (crystallised glass), filter, electrical insulator, electronic substrate, catalyst and/or infrared-transmitting window.

In a further broad from, the present invention provides a body of material including a percolated mullite microstructure extending continuously and/or substantially throughout the entire body.

In one form, the material is a 3-3 composite.

In another form, the material is a 0-3 composite.

BRIEF DESCRIPTION OF THE FIGURES

Examples of the present invention will now be described with reference to the accompanying drawings, in which:

FIG. 11c is a scanning electron microscope (SEM) image of fly ash 1 (polished and etched) after heat treatment for 1 hour at 1500° C.

FIG. 13e is an SEM image of blend 1 (polished and etched) after heat treatment for 8 hours at 1500° C.

FIG. 13f is an SEM image of blend 1 (polished and etched) after heat treatment for 24 hours at 1500° C.

FIG. 18 is a table showing the aforementioned Data Set 1.
FIG. 19 is a table showing the aforementioned Data Set 2.
FIG. 20 is a table showing the aforementioned Data Set 3.
FIG. 21 is a table showing the aforementioned Data Set 4.
FIG. 22 is a table showing the aforementioned Data Set 5.
FIG. 23 is a table showing the aforementioned Data Set 6.

DETAILED DESCRIPTION

Figure 1:
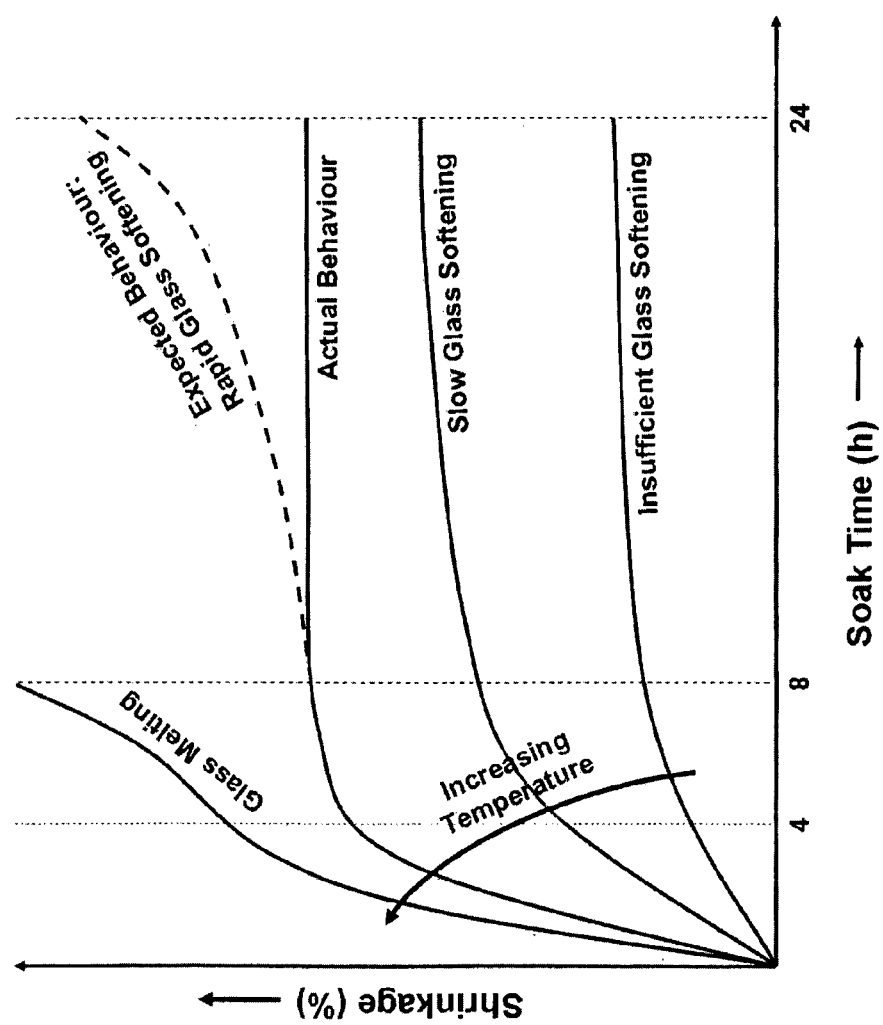
FIG. 1 is a schematic illustration of the effects of temperature and time on the deformation (viz., shrinkage) of typical ceramic materials that contain a vitreous (glassy) sintering (densification) aid.
Figure 2:
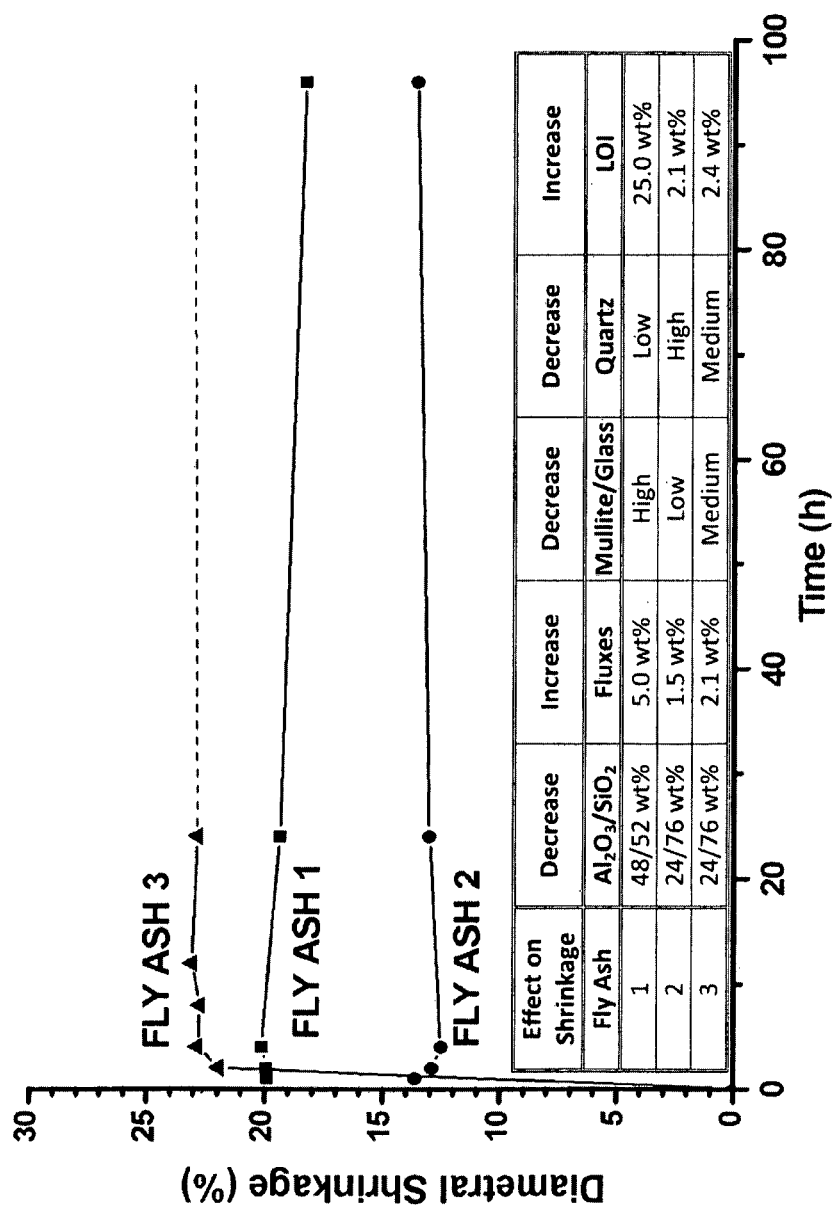
FIG. 2 is graph of complete data for diametral shrinkage of three fly ashes (sole component) as a function of heating time to 96 hours or 24 hours at 1500° C.; supplementary tabulated information also is included.
Figure 3A:
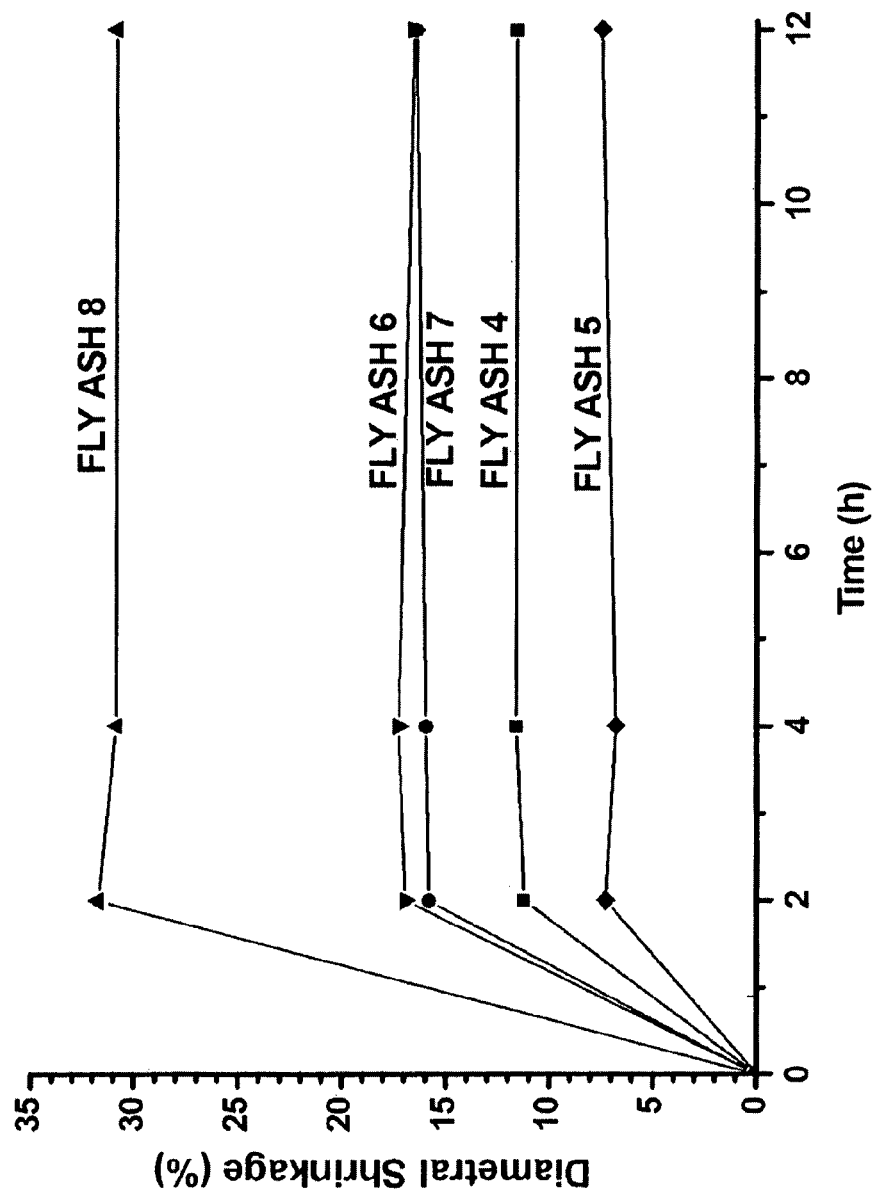
FIG. 3a is a graph of data for diametral shrinkage of an additional five fly ashes (sole component) as a function of heating time to 12 hours at 1500° C.
Figure 3B:
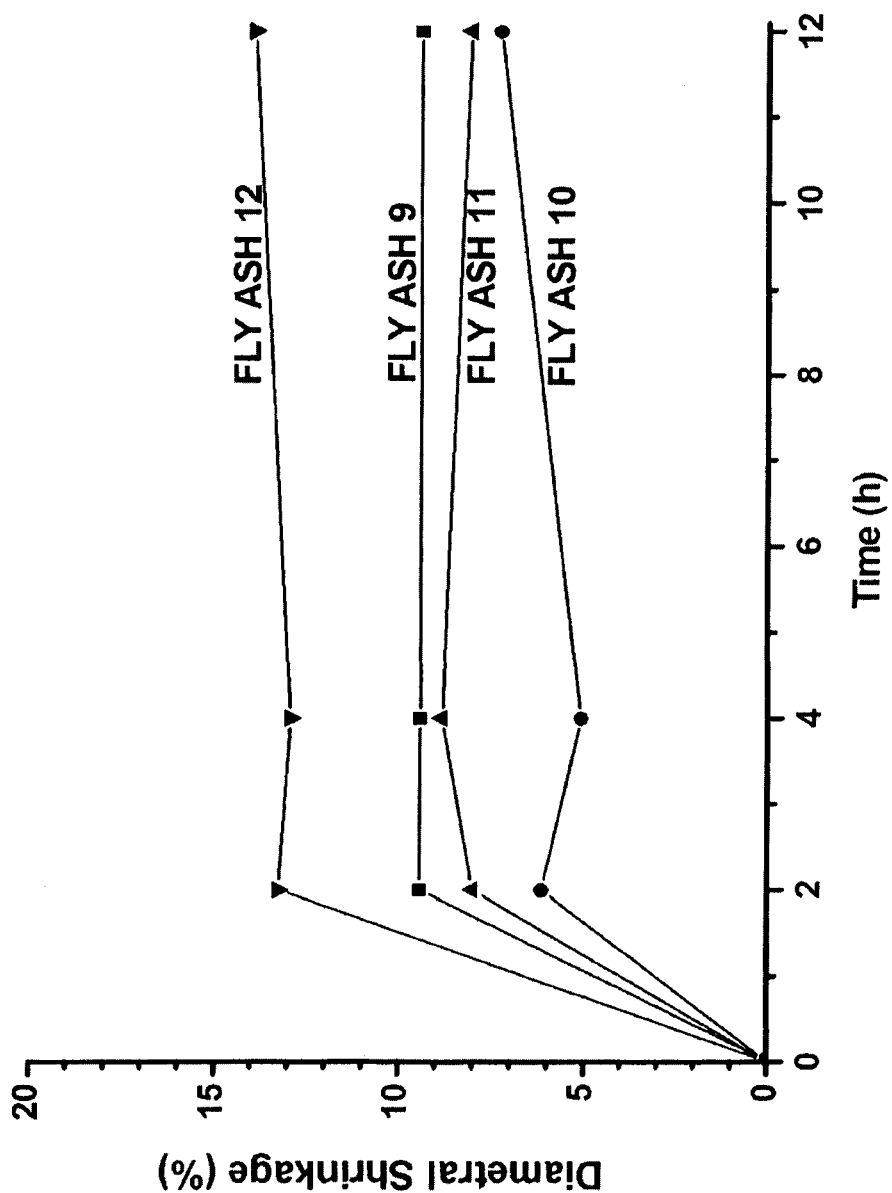
FIG. 3b is a graph of data for diametral shrinkage of an additional four fly ashes (sole component), which melted at 1500° C., as a function of heating time to 12 hours at 1400° C.
Figure 4:
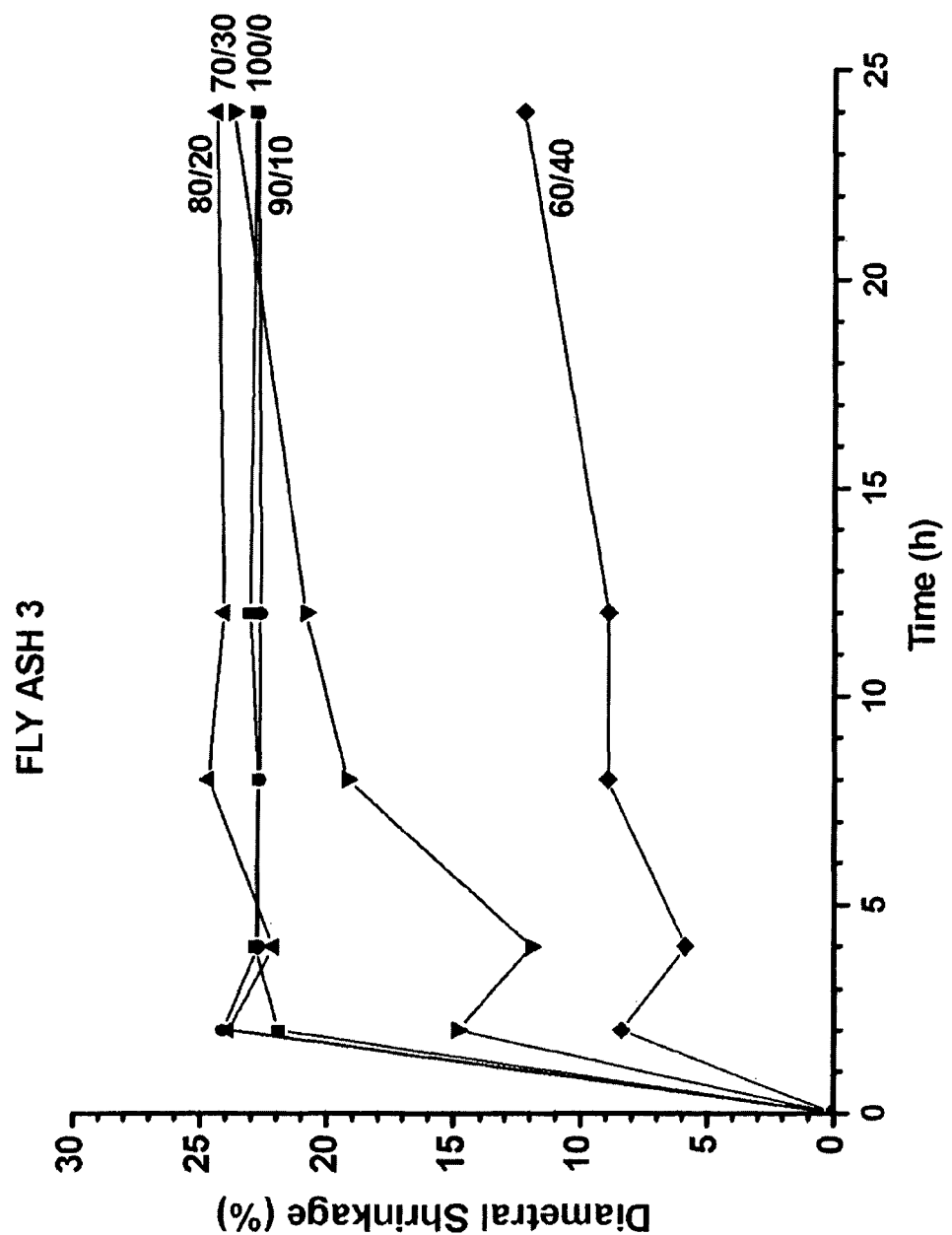
FIG. 4 is a graph of complete data for diametral shrinkage of one set of fly ash/alumina blends as a function of heating time to 24 hours at 1500° C.
Figure 5:
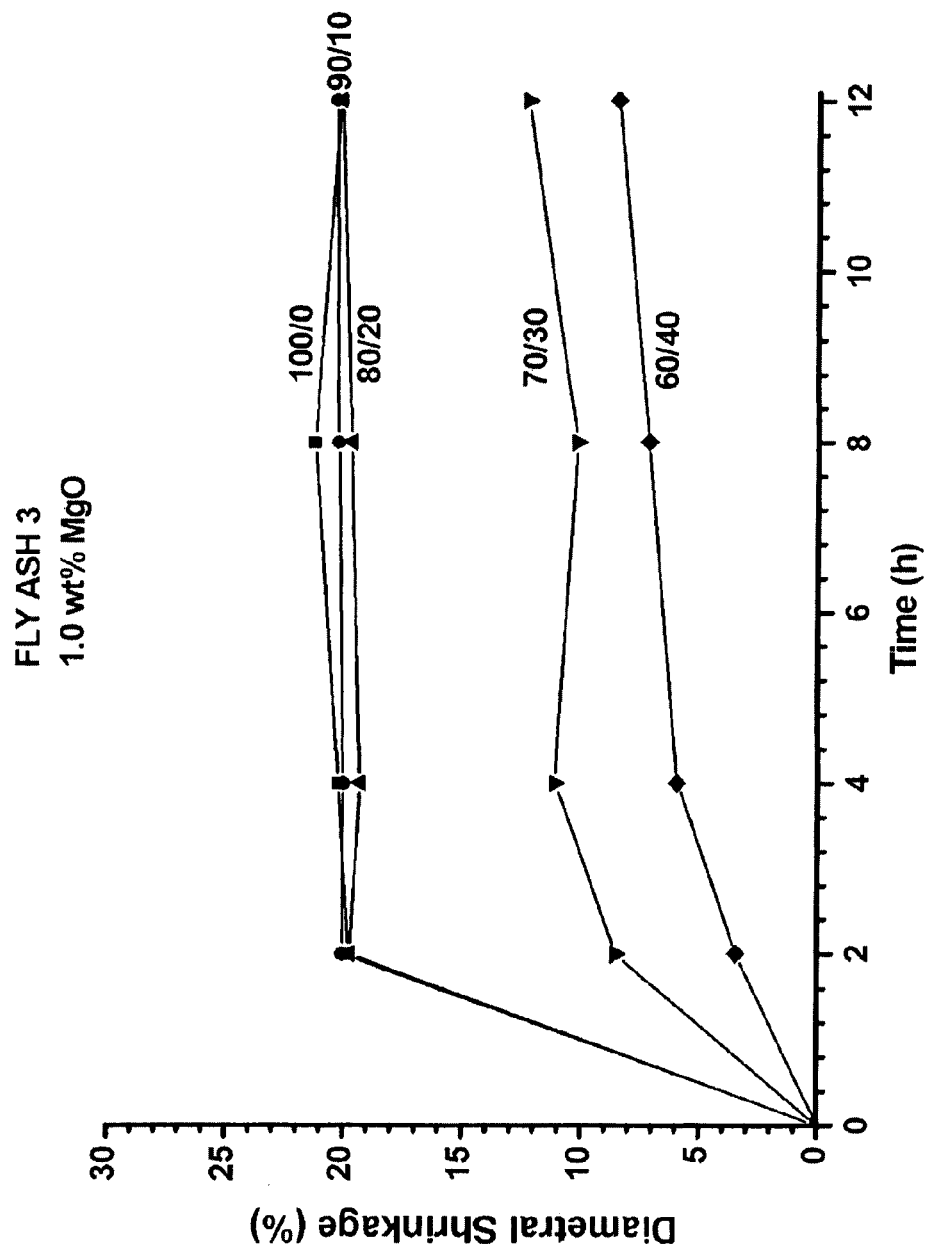
FIG. 5 is a graph of complete data for diametral shrinkage of one set of fly ash/alumina blends with 1.0 wt % magnesium oxide (periclase, MgO) added as a flux and mullite fibre growth modifier as a function of heating time to 12 hours at 1500° C.
Figure 6:
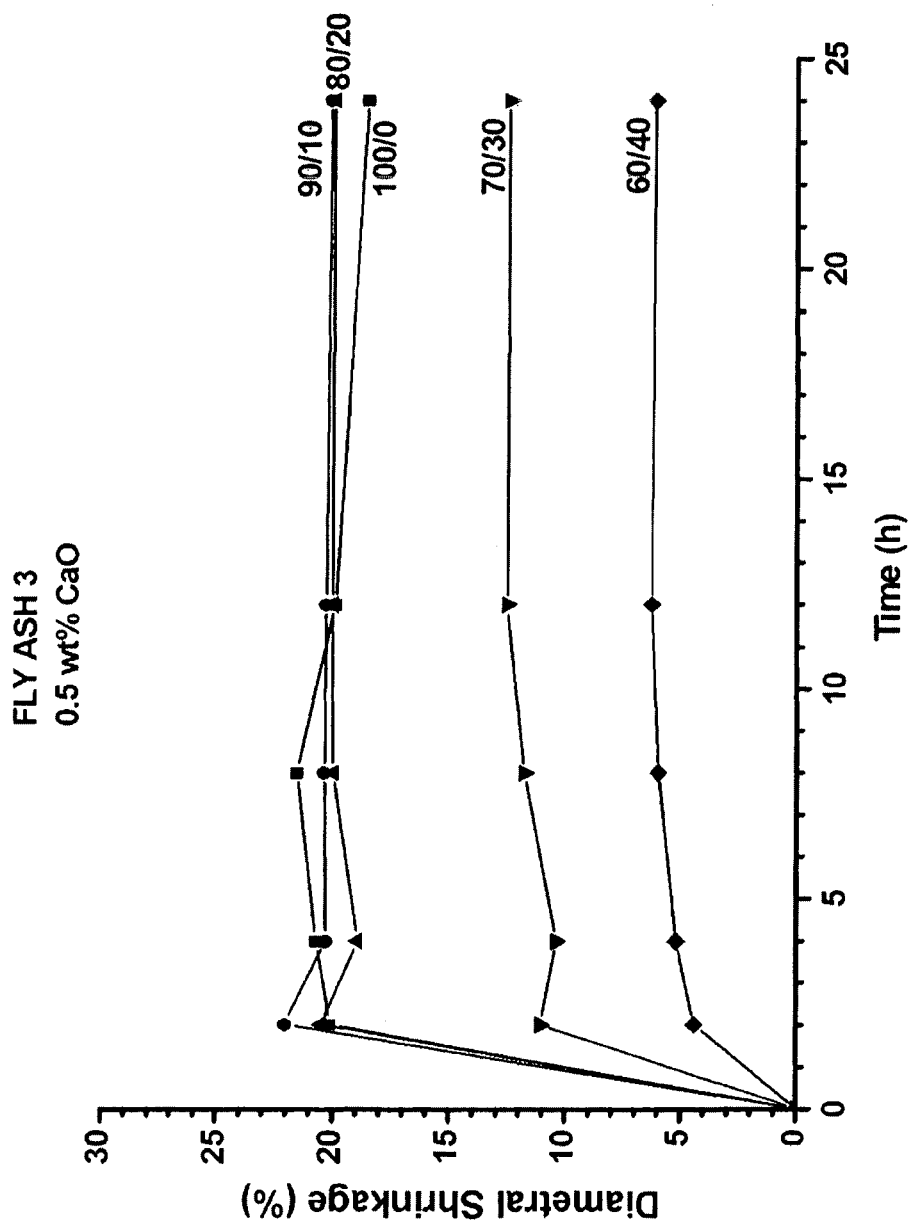
FIG. 6 is a graph of complete data for diametral shrinkage of one set of fly ash/alumina blends with 0.5 wt % calcium oxide (line, CaO) added as a flux and mullite fibre growth modifier as a function of heating time to 24 hours at 1500° C.
Figure 7:
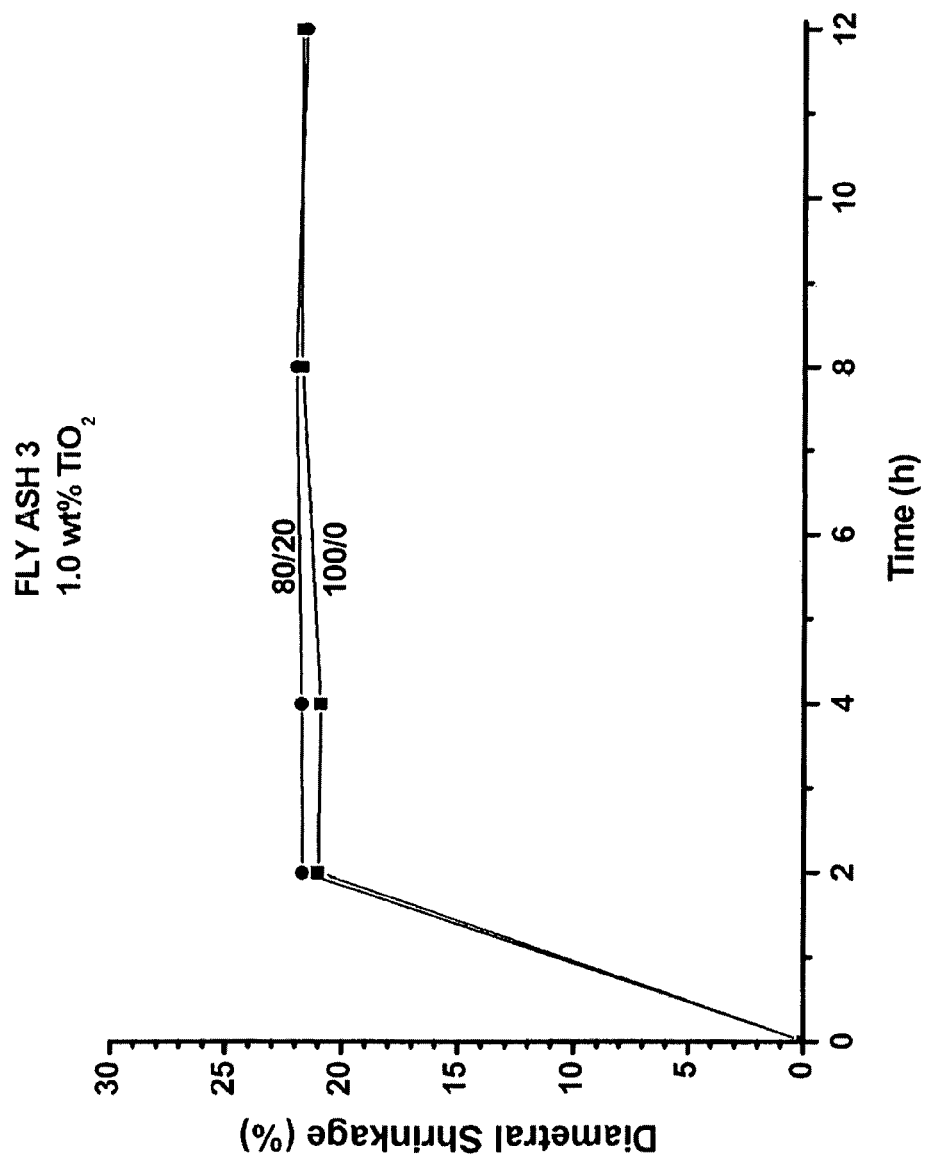
FIG. 7 is a graph of complete data for diametral shrinkage of one set of fly ash/alumina blends with 1.0 wt % titanium dioxide (rutile, $TiO_2$) added as a flux and mullite fibre growth modifier as a function of heating time to 12 hours at 1500° C.
Figure 8:
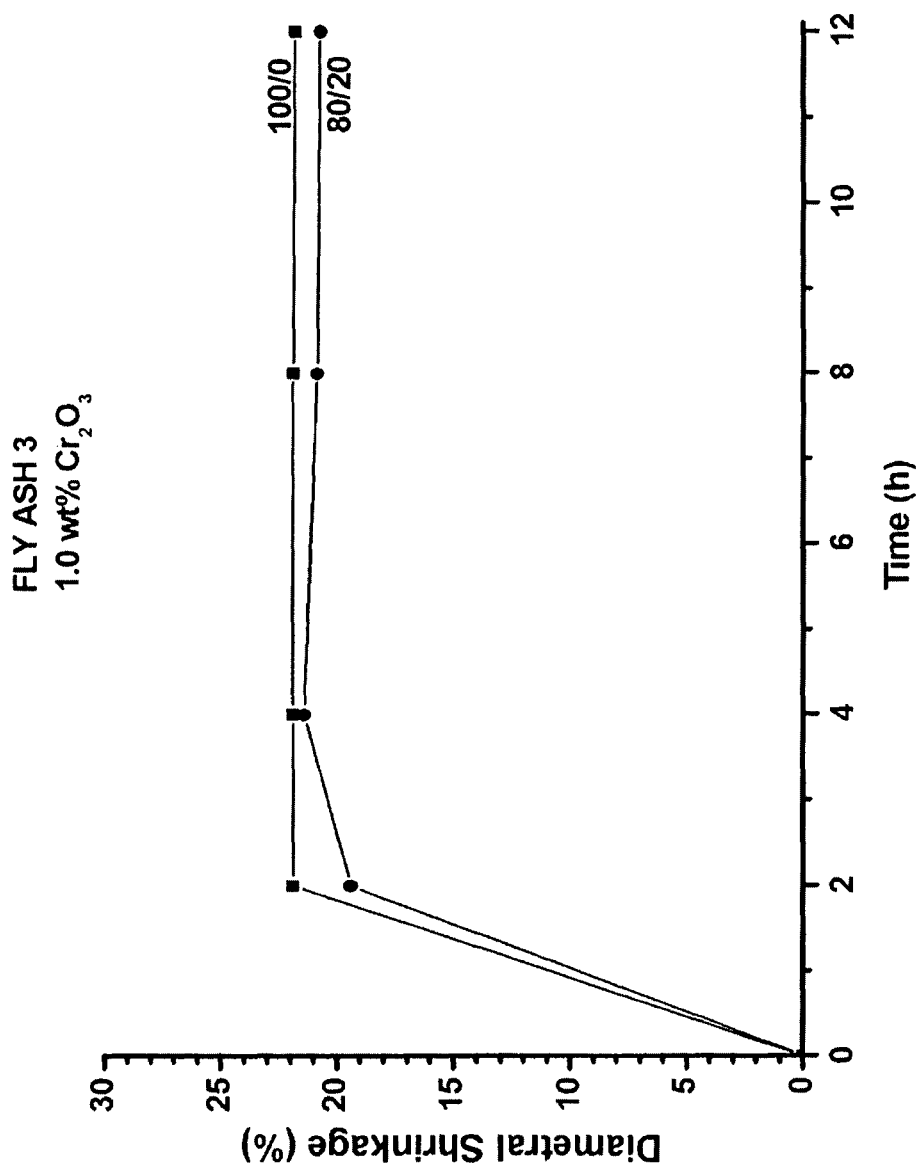
FIG. 8 is a graph of complete data for diametral shrinkage of one set of fly ash/alumina blends with 1.0 wt % chromium oxide (eskolaite, $Cr_2O_3$) added as a flux and mullite fibre growth modifier as a function of heating time to 12 hours at 1500° C.
Figure 9:
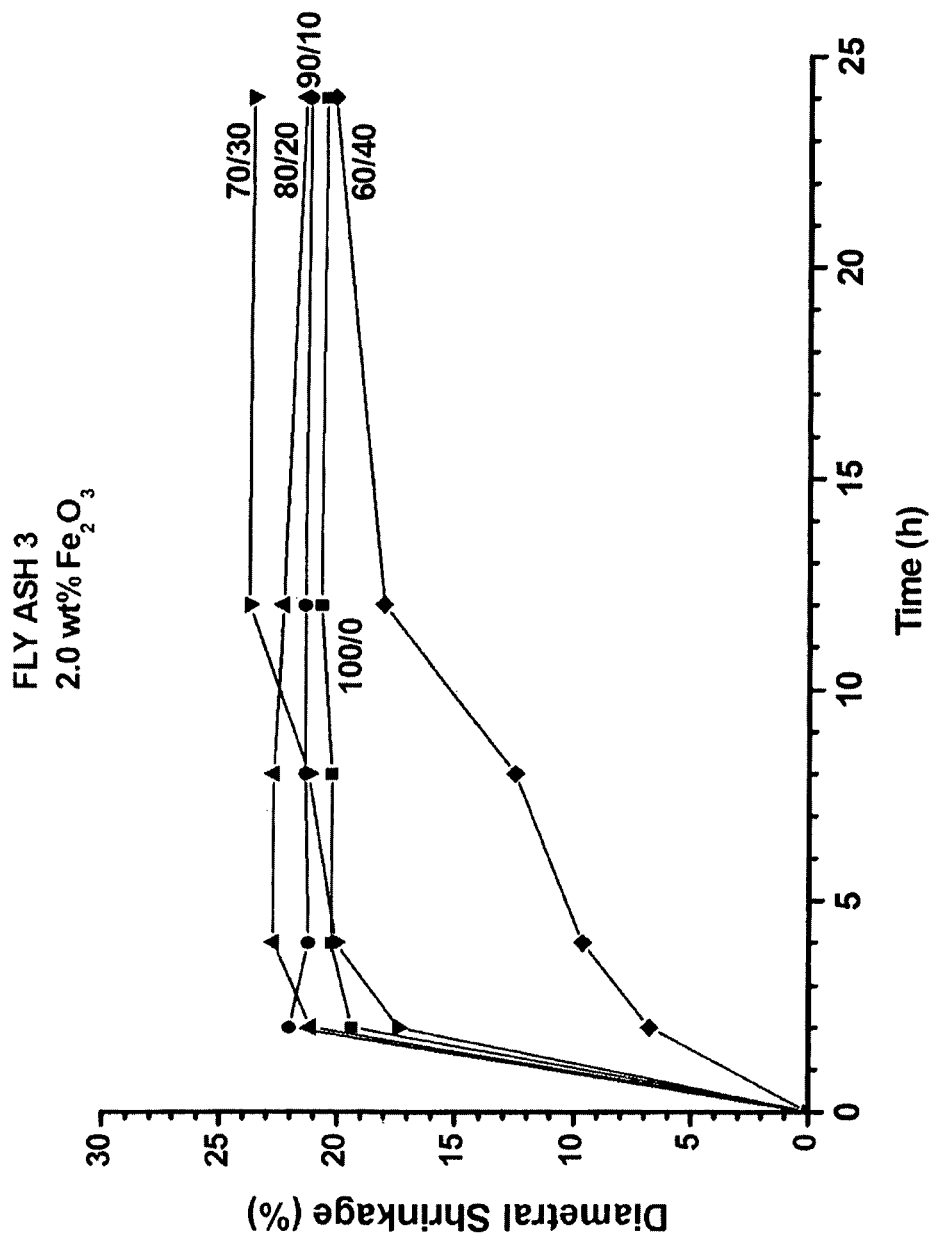
FIG. 9 is a graph of complete data for diametral shrinkage of one set of fly ash/alumina blends with 2.0 wt % iron oxide (haematite, $Fe_2O_3$) added as a flux and mullite fibre growth modifier as a function of heating time to 24 hours at 1500° C.
Figure 10:
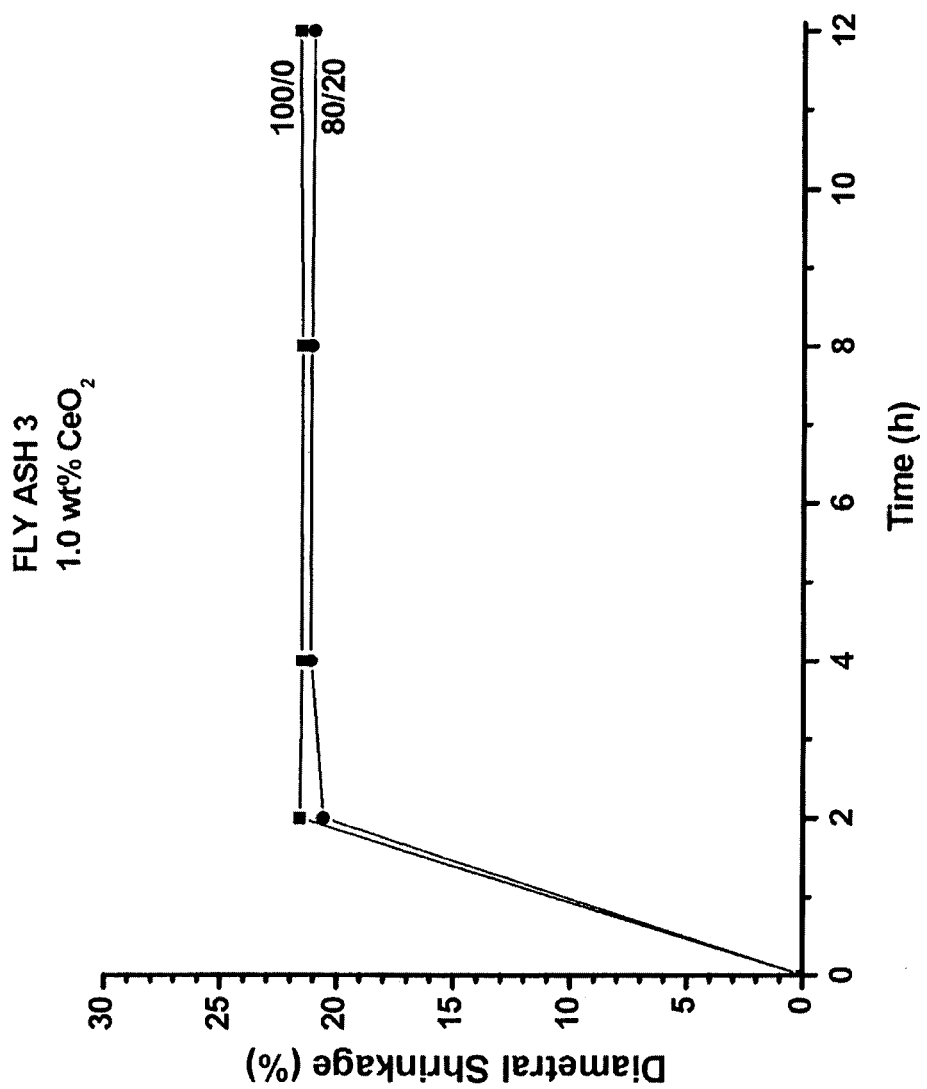
FIG. 10 is a graph of complete data for diametral shrinkage of one set of fly ash/alumina blends with 1.0 wt % cerium oxide (cerianite, $CeO_2$) added as a flux and mullite fibre growth modifier as a function of heating time to 12 hours at 1500° C.
Figure 11A:
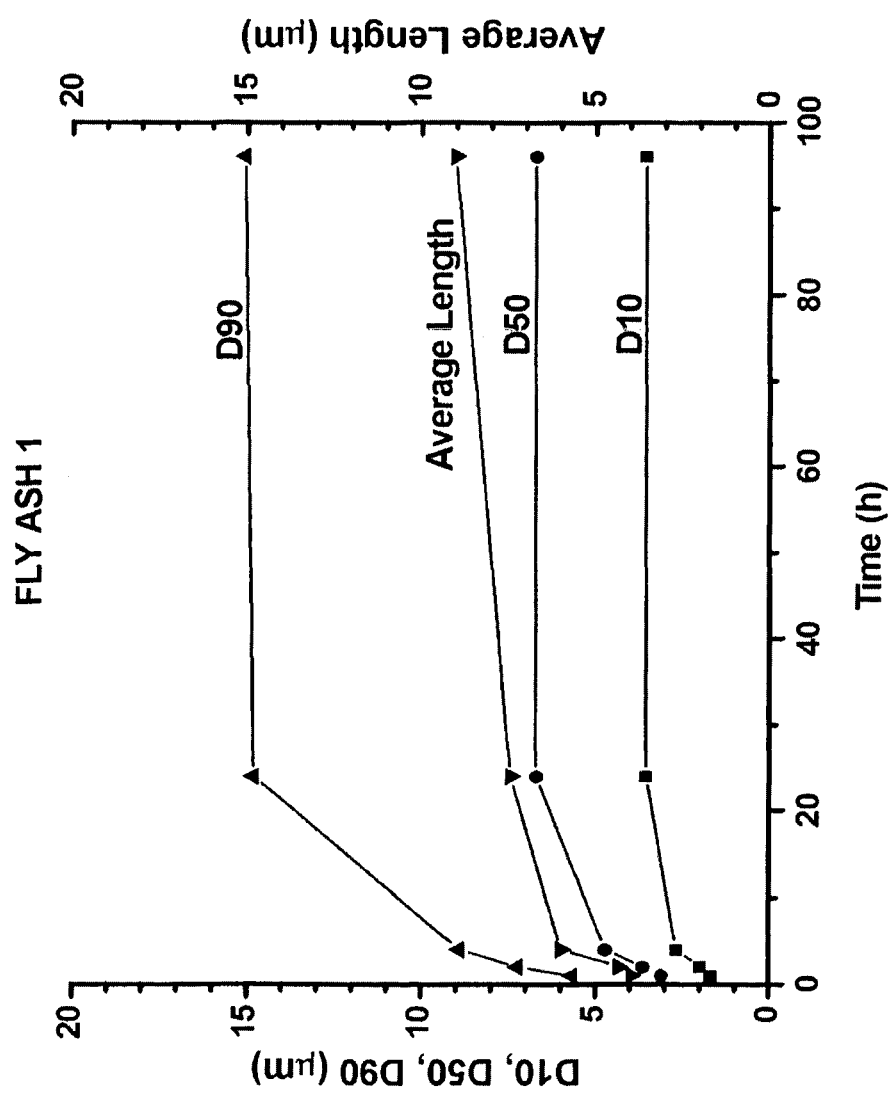
FIG. 11a is a graph of D10, D50, D90 (i.e., 10%, 50%, 90% of total number of fibres, respectively) and average length as a function of heating time to 96 hours at 1500° C., as extracted from Data Set 1 (fly ash 1).
Figure 11B:
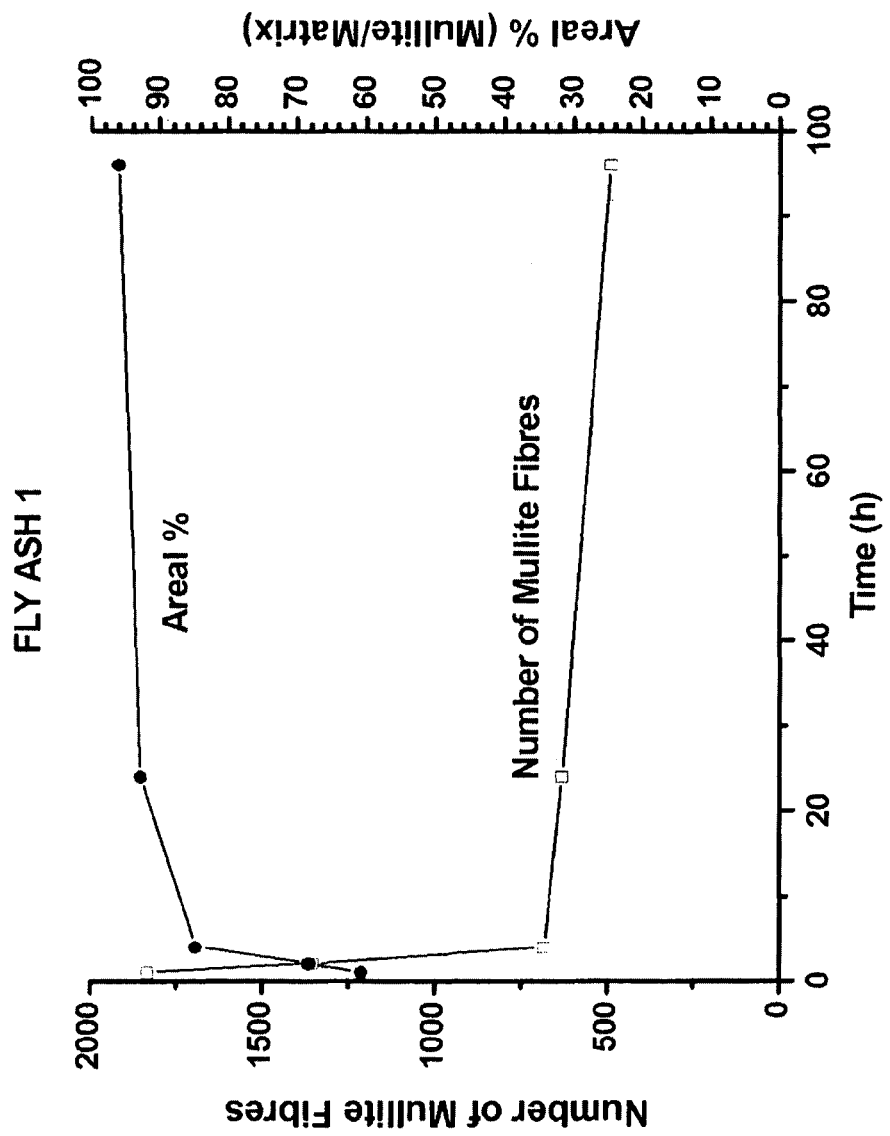
FIG. 11b is a graph of the number of fibres and areal distribution of fibres (%) as a function of heating time to 96 hours at 1500° C., as extracted from Data Set 1 (fly ash 1).
Figure 11D:
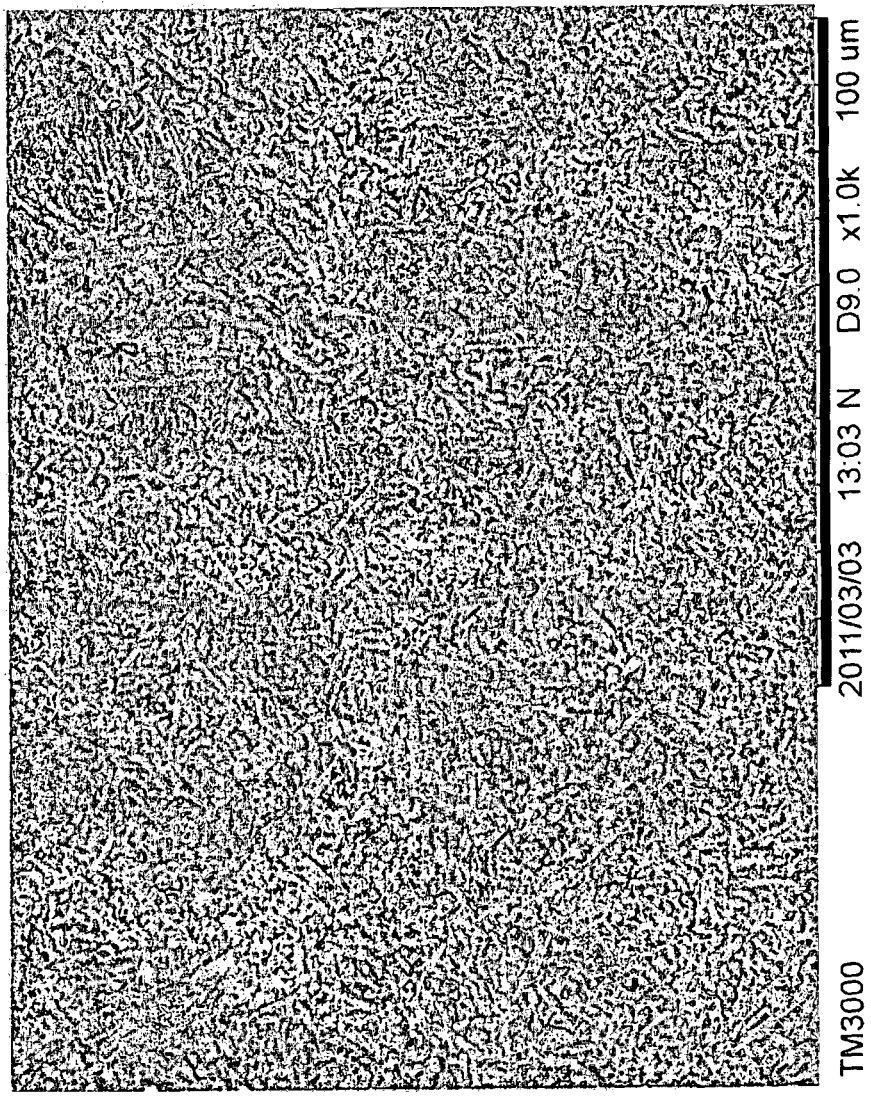
FIG. 11d is an SEM image of fly ash 1 (polished and etched) after heat treatment for 4 hours at 1500° C.
Figure 11E:
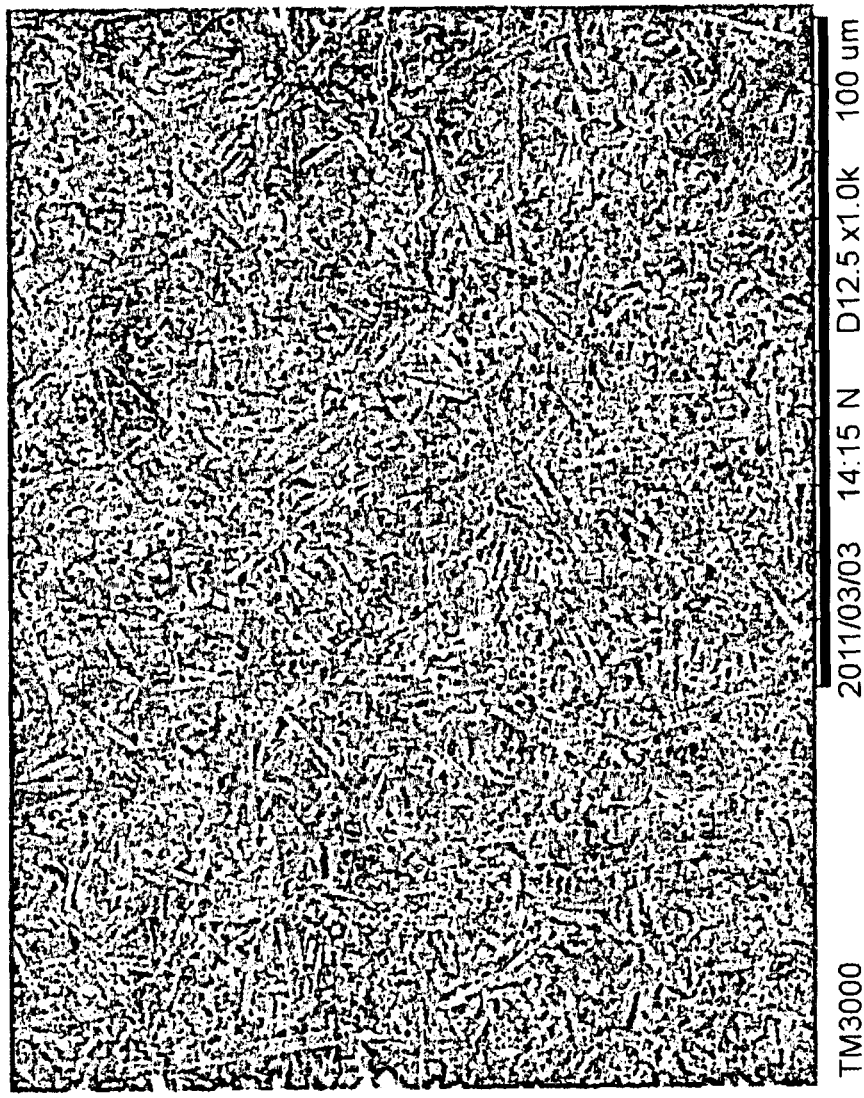
FIG. 11e is an SEM image of fly ash 1 (polished and etched) after heat treatment for 24 hours at 1500° C.
Figure 11F:
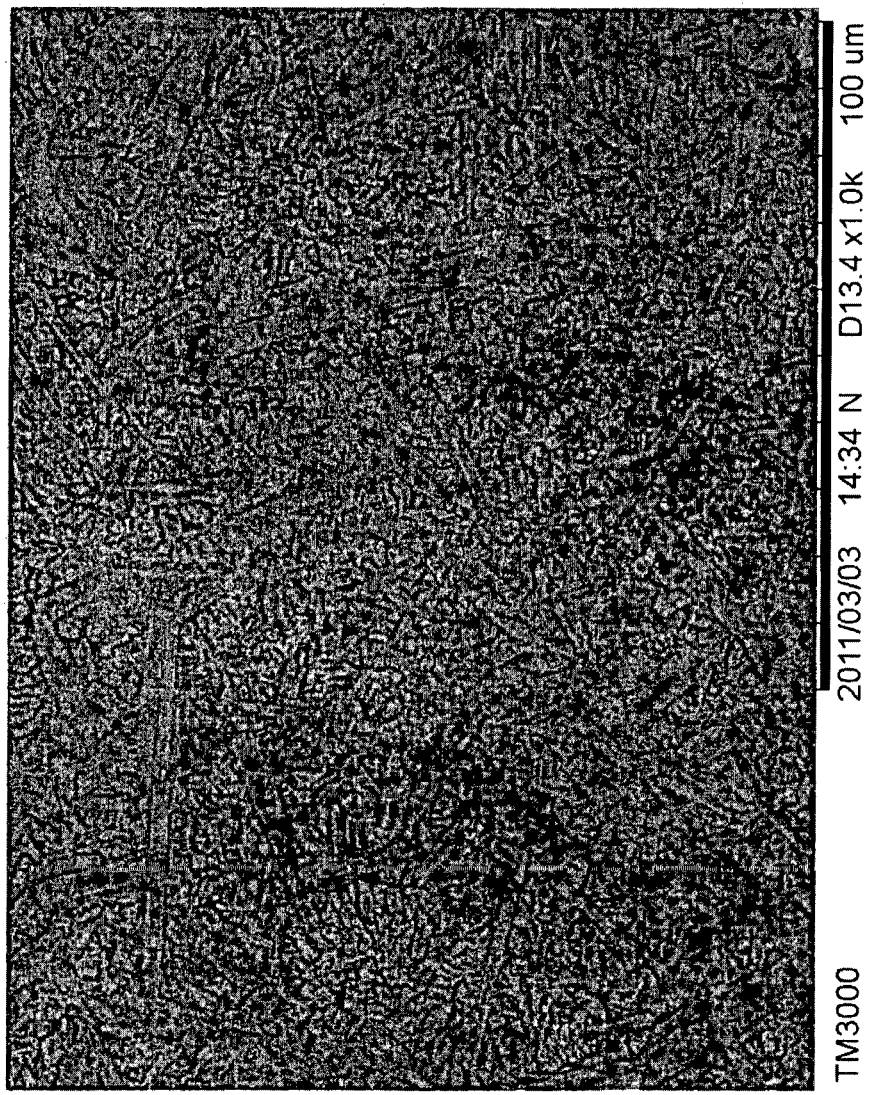
FIG. 11f is an SEM image of fly ash 1 (polished and etched) after heat treatment, for 96 hours at 1500° C.
Figure 12A:
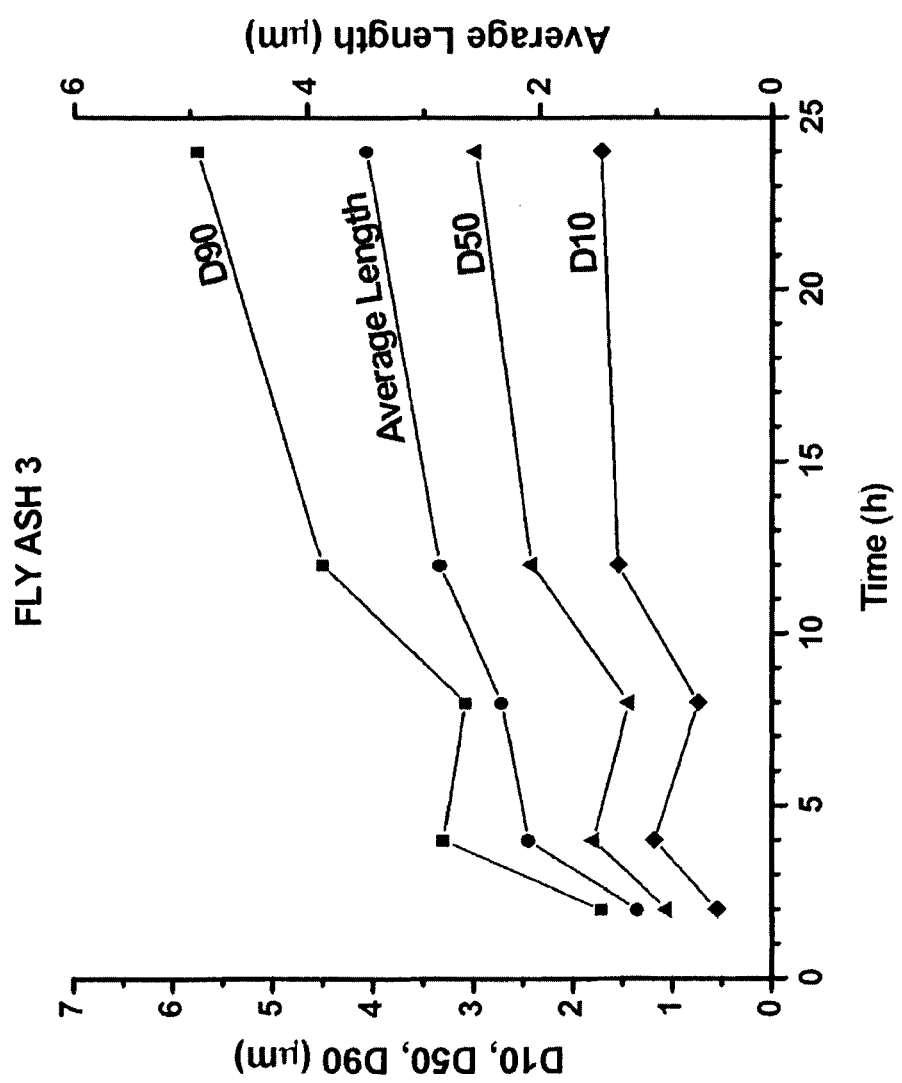
FIG. 12a is a graph of D10, D50, D90 (i.e., 10%, 50%, 90% of total number of fibres, respectively) and average length as a function of heating time to 24 hours at 1500° C., as extracted from Data Set 2 (fly ash 3
Figure 12B:
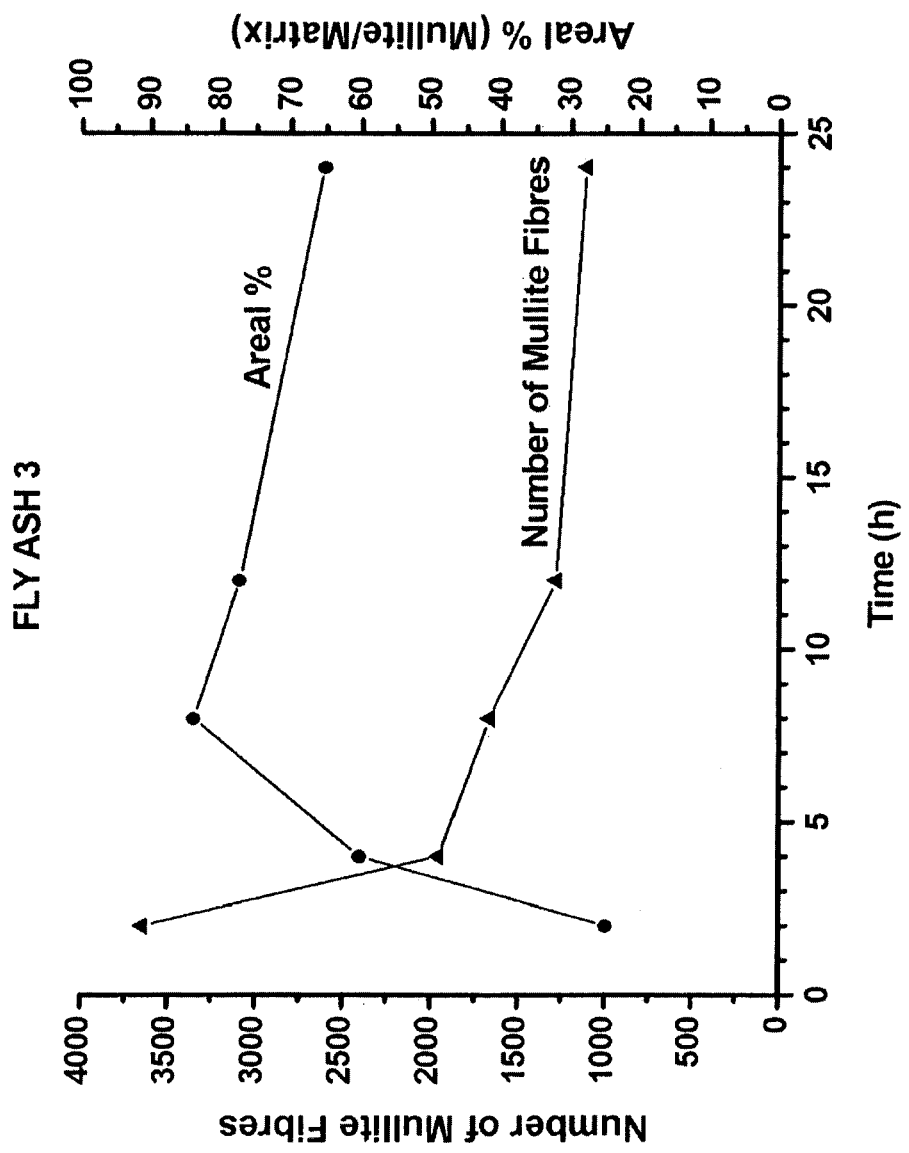
FIG. 12b is a graph of the number of fibres and areal distribution of fibres (%) as a function of heating time to 24 hours at 1500° C., as extracted from Data Set 2 (fly ash 3).
Figure 12C:
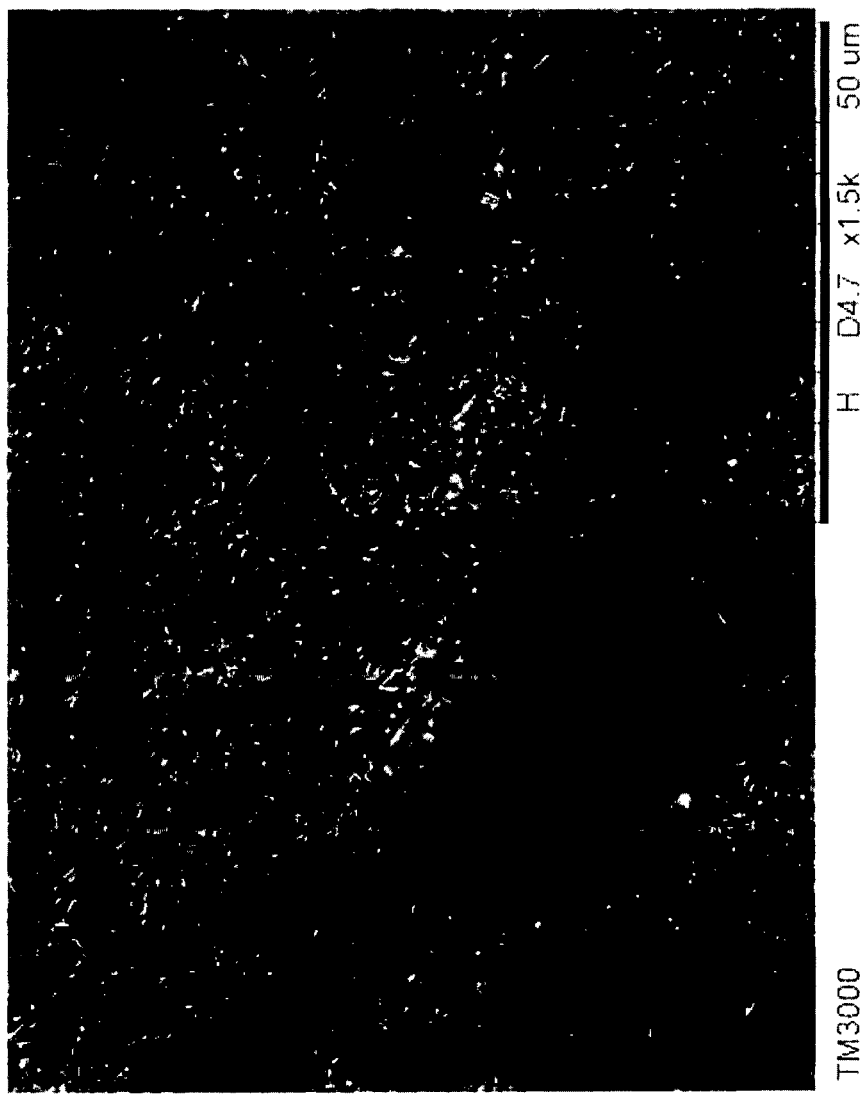
FIG. 12c is a scanning electron microscope (SEM) image of fly ash 3 (polished and etched) after heat treatment for 2 hours at 1500° C.
Figure 12D:
FIG. 12d is an SEM image of fly ash 3 (polished and etched) after heat treatment for 4 hours at 1500° C.
Figure 12E:
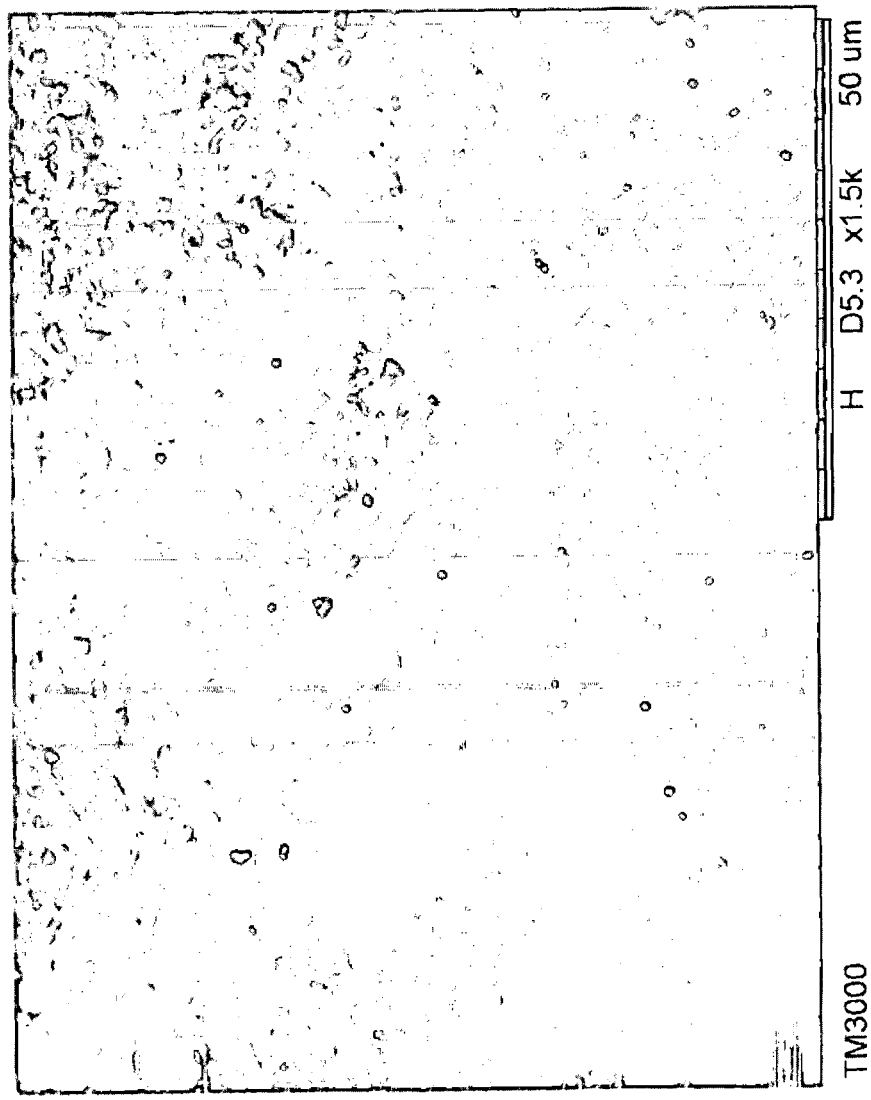
FIG. 12e is an SEM image of fly ash 3 (polished and etched) after heat treatment for 8 hours at 1500° C.
Figure 12F:
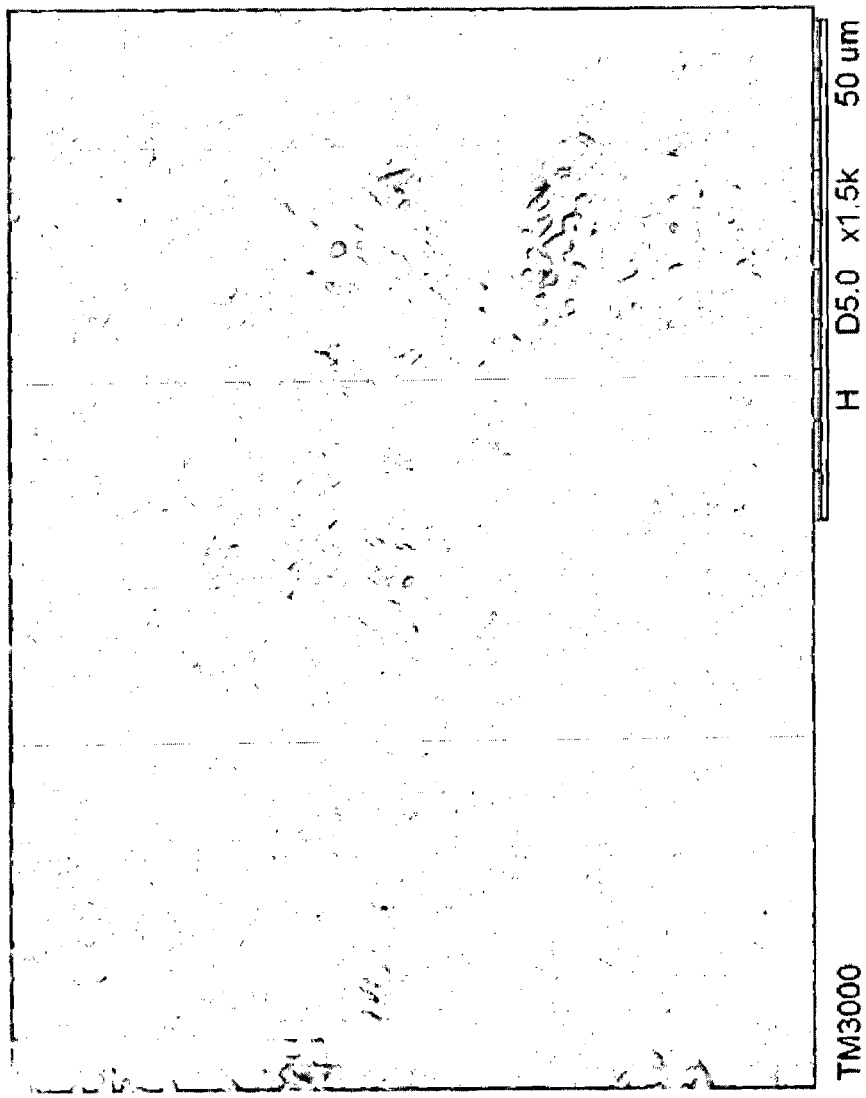
FIG. 12f is an SEM image of fly ash 3 (polished and etched) after heat treatment for 24 hours at 1500° C.
Figure 13A:
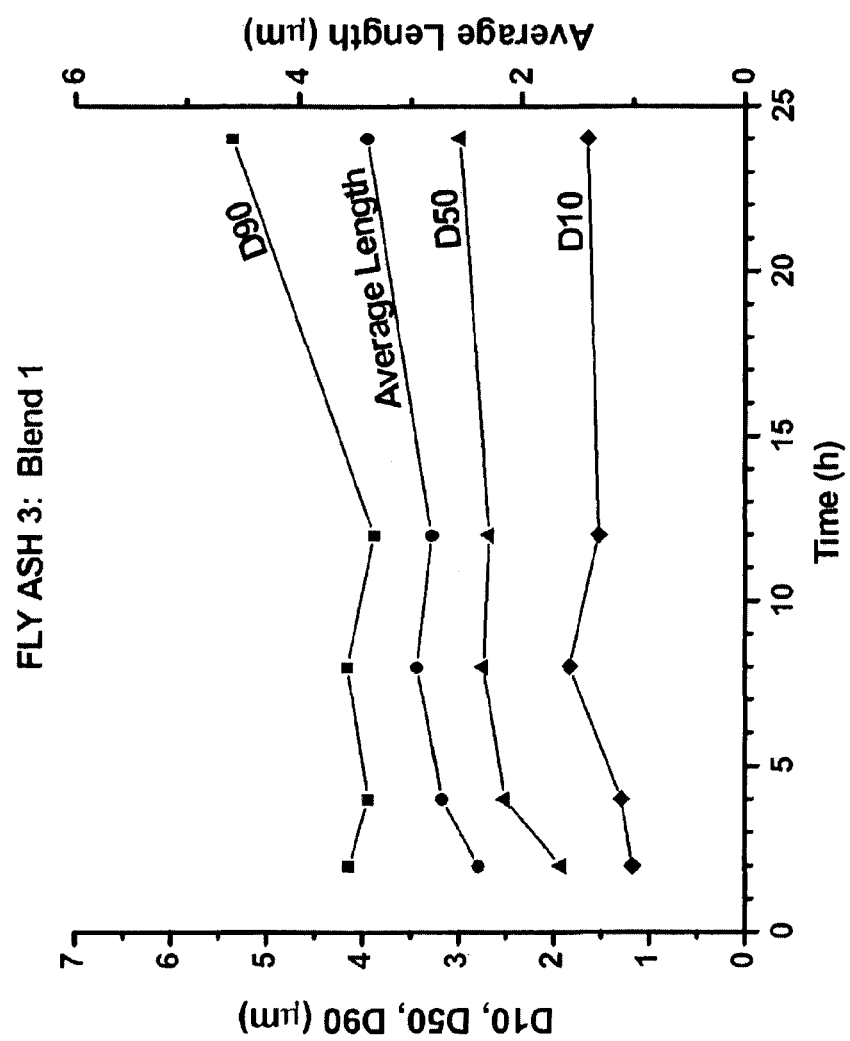
FIG. 13a is a graph of D10, D50, D90 (i.e., 10%, 50%, 90% of total number of fibres, respectively) and average length as a function of heating time to 24 hours at 1500° C., as extracted from Data Set 3 (90/10 fly ash/alumina blend 1)
Figure 13B:
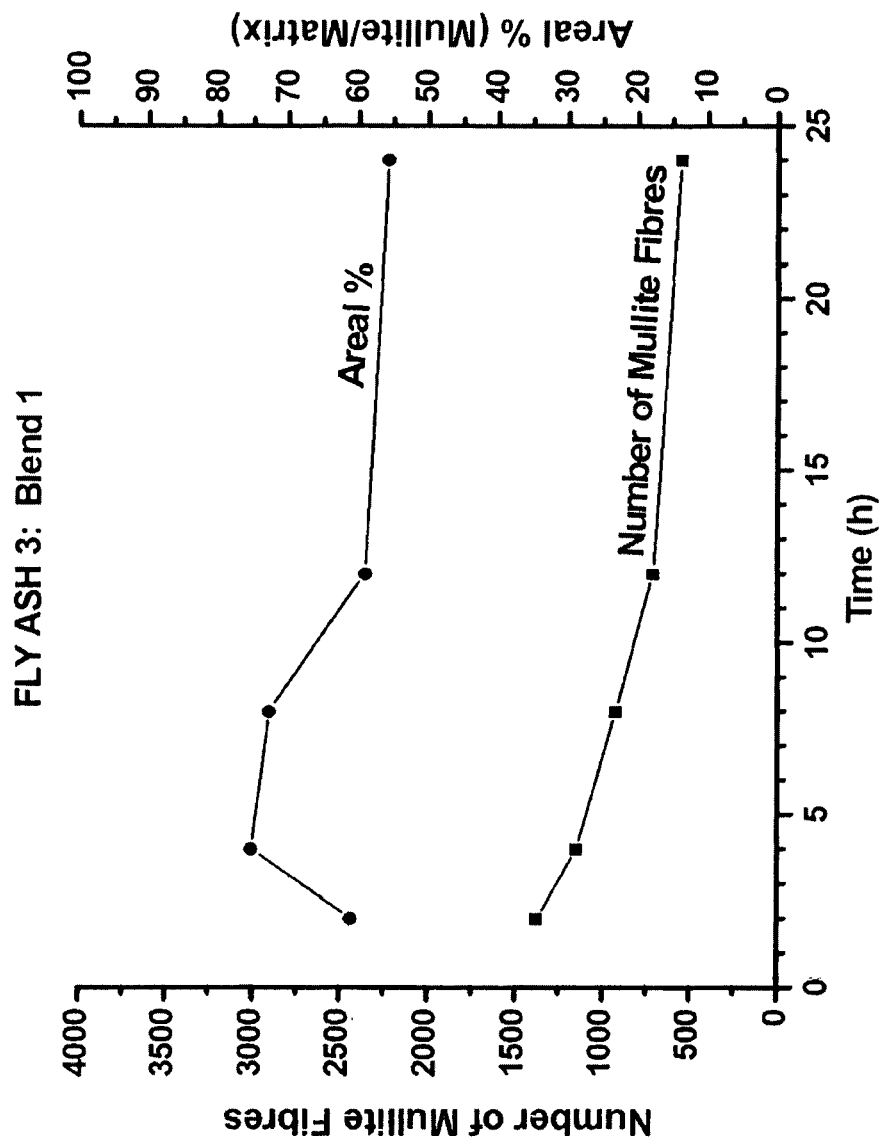
FIG. 13b is a graph of the number of fibres and areal distribution of fibres (%) as a function of heating time to 24 hours at 1500° C., as extracted from Data Set 3 (blend 1).
Figure 13C:
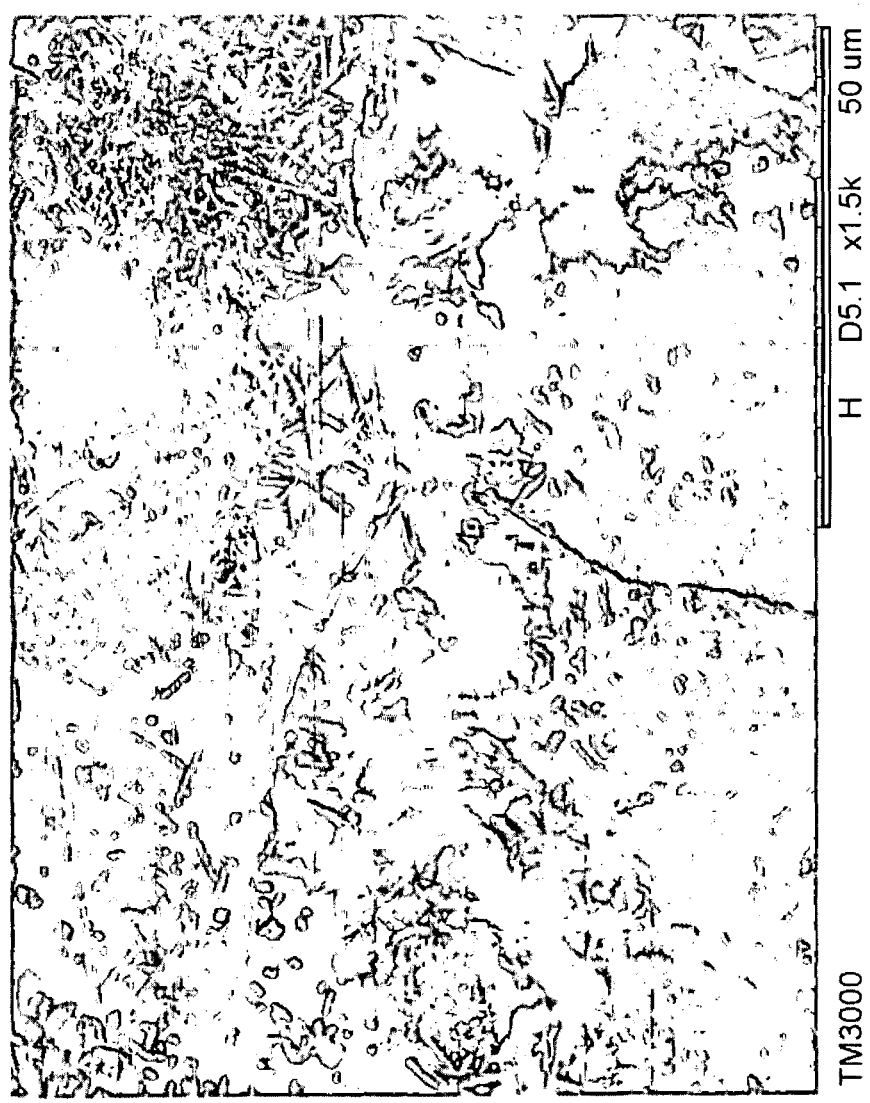
FIG. 13c is a scanning electron microscope (SEM) image of blend 1 (polished and etched) after heat treatment for 2 hours at 1500° C.
Figure 13D:
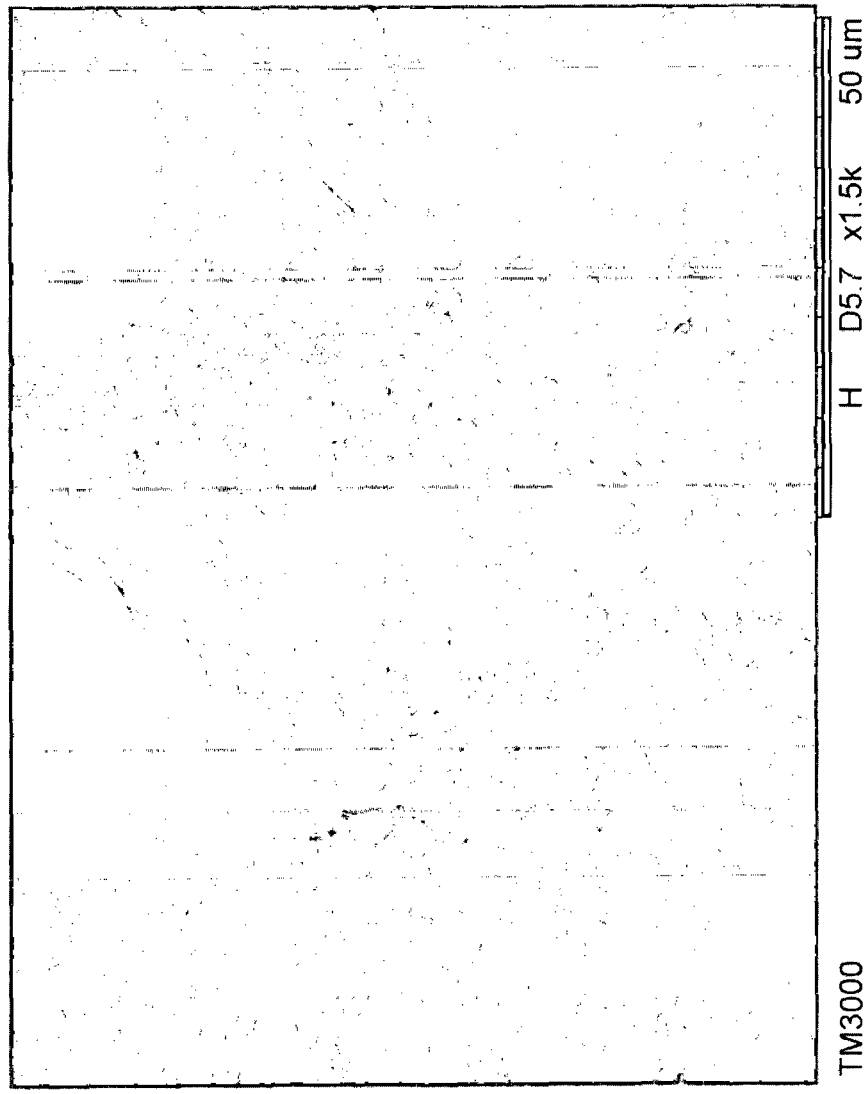
FIG. 13d is an SEM image of blend 1 (polished and etched) after heat treatment for 4 hours at 1500° C.
Figure 14A:
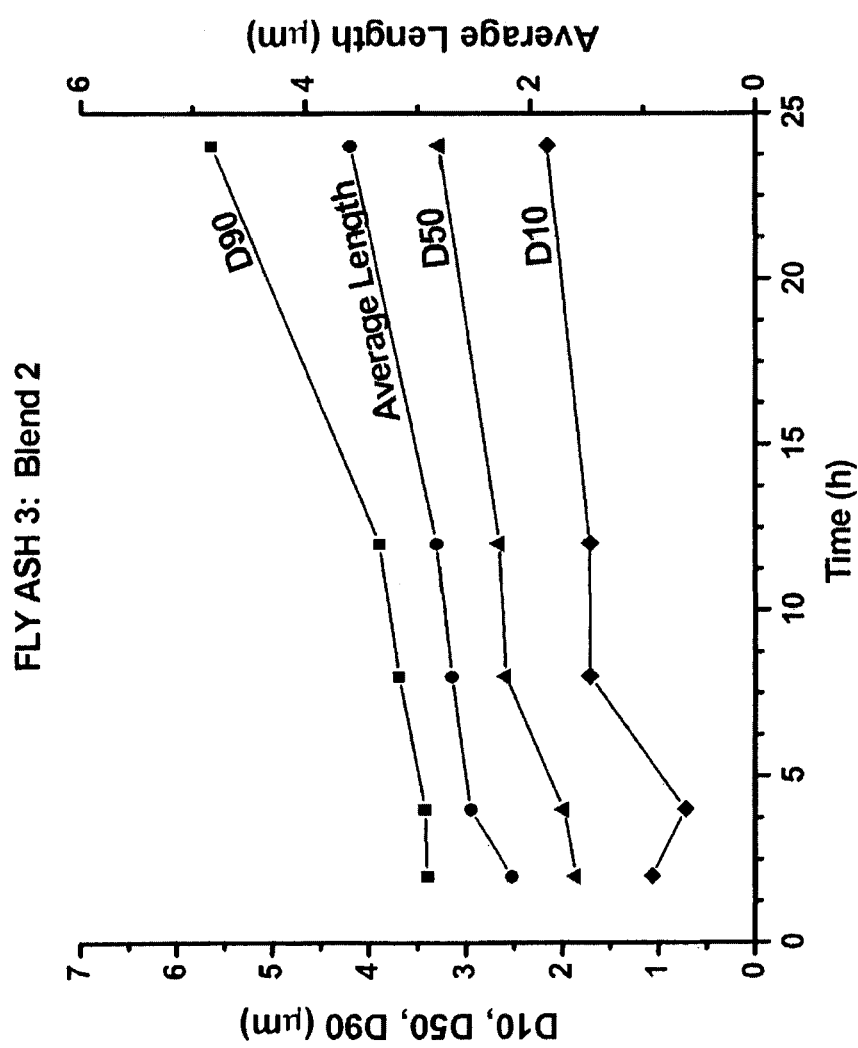
FIG. 14a is a graph of D10, D50, D90 (i.e., 10%, 50%, 90% of total number of fibres, respectively) and average length as a function of heating time to 24 hours at 1500° C., as extracted from Data Set 4 (80/20 fly ash/alumina blend 2)
Figure 14B:
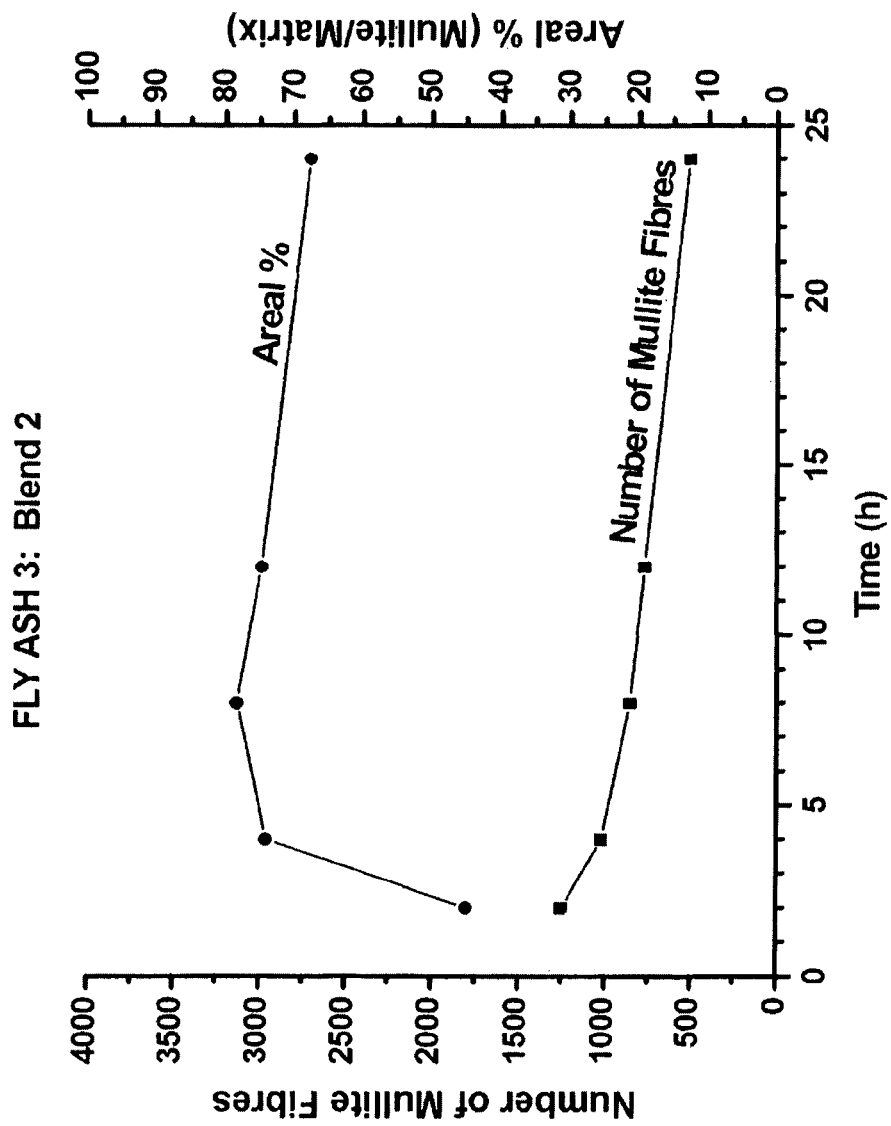
FIG. 14b is a graph of the number of fibres and areal distribution of fibres (%) as a function of heating time to 24 hours at 1500° C., as extracted from Data Set 4 (blend 2).
Figure 14C:
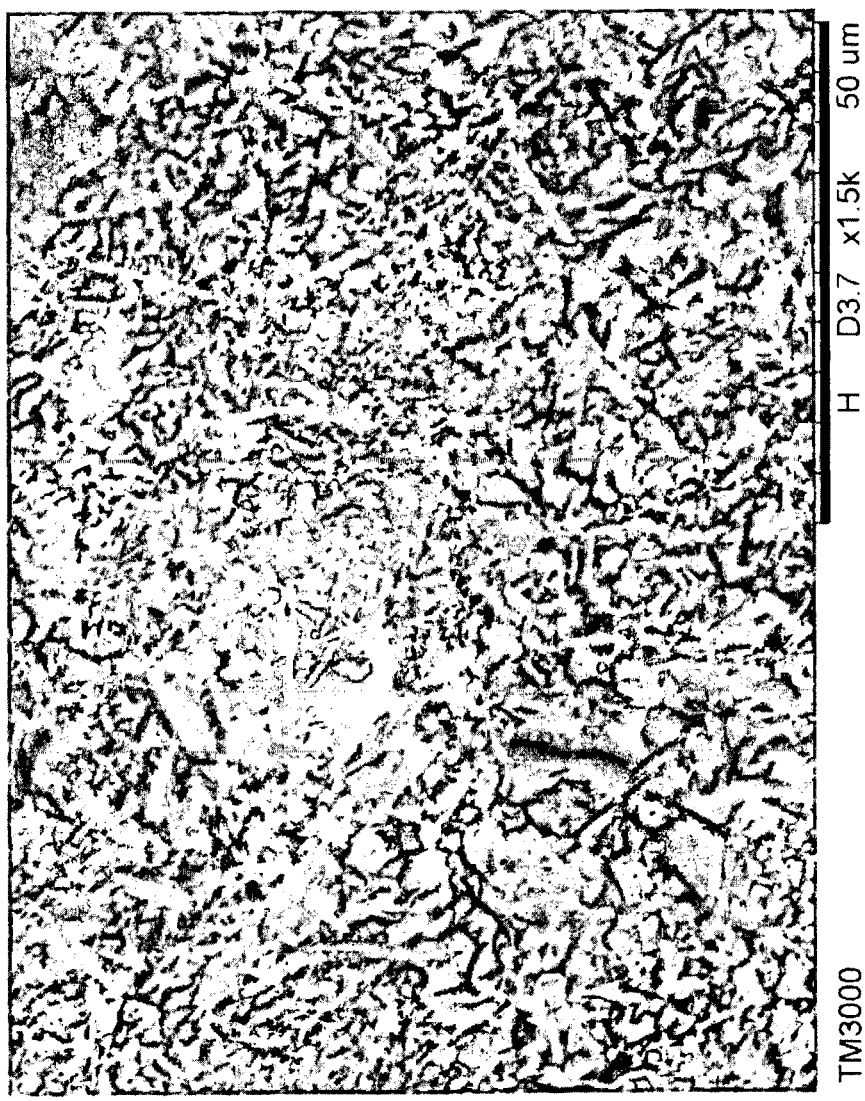
FIG. 14c is a scanning electron microscope (SEM) image of blend 2 (polished and etched) after heat treatment for 2 hours at 1500° C.
Figure 14D:
FIG. 14d is an SEM image of blend 2 (polished and etched) after heat treatment for 4 hours at 1500° C.
Figure 14E:
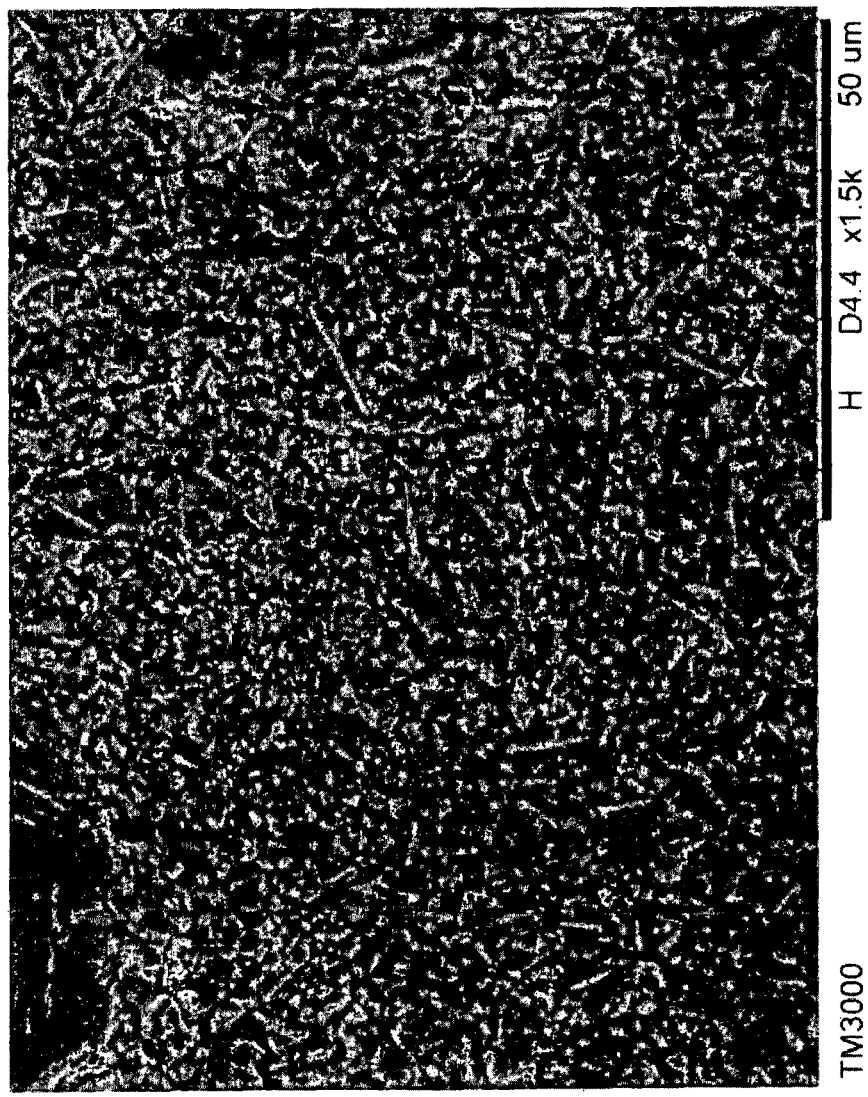
FIG. 14e is an SEM image of blend 2 (polished and etched) after heat treatment for 8 hours at 1500° C.
Figure 14F:
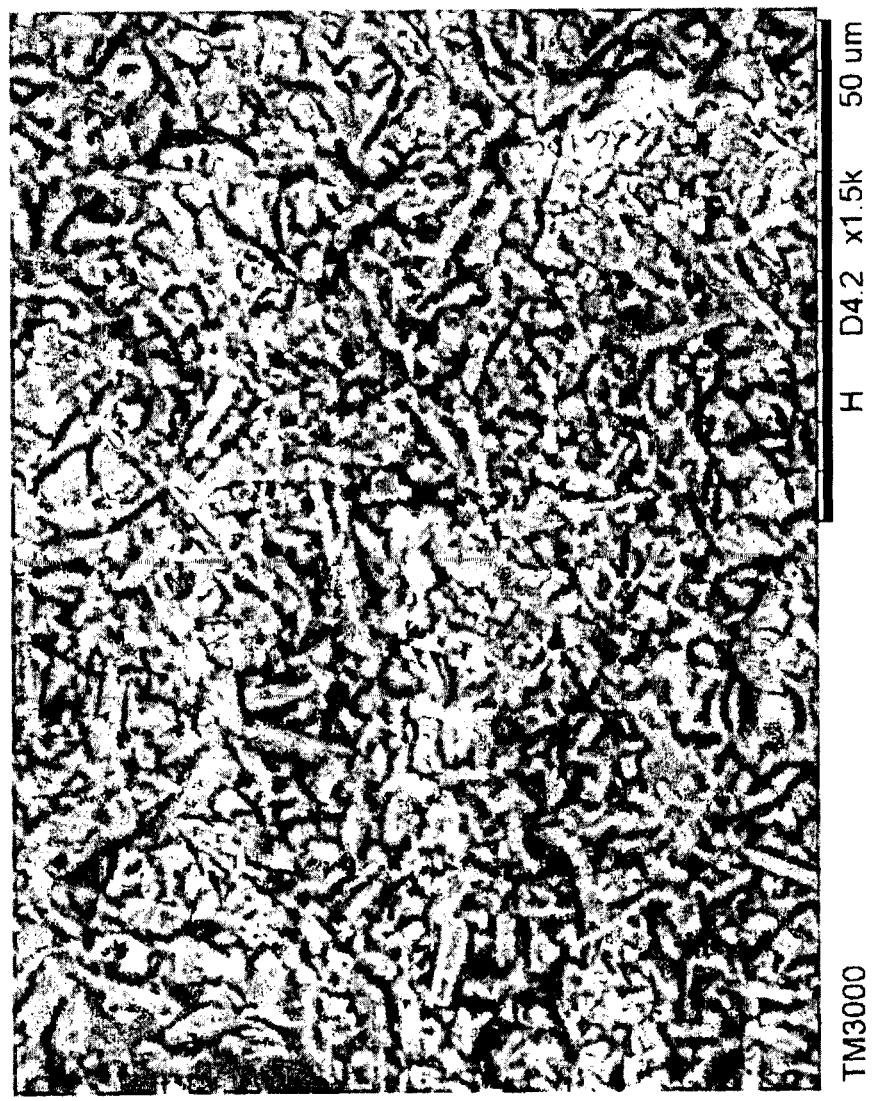
FIG. 14f is an SEM image of blend 2 (polished and etched) after heat treatment for 24 hours at 1500° C.
Figure 15A:
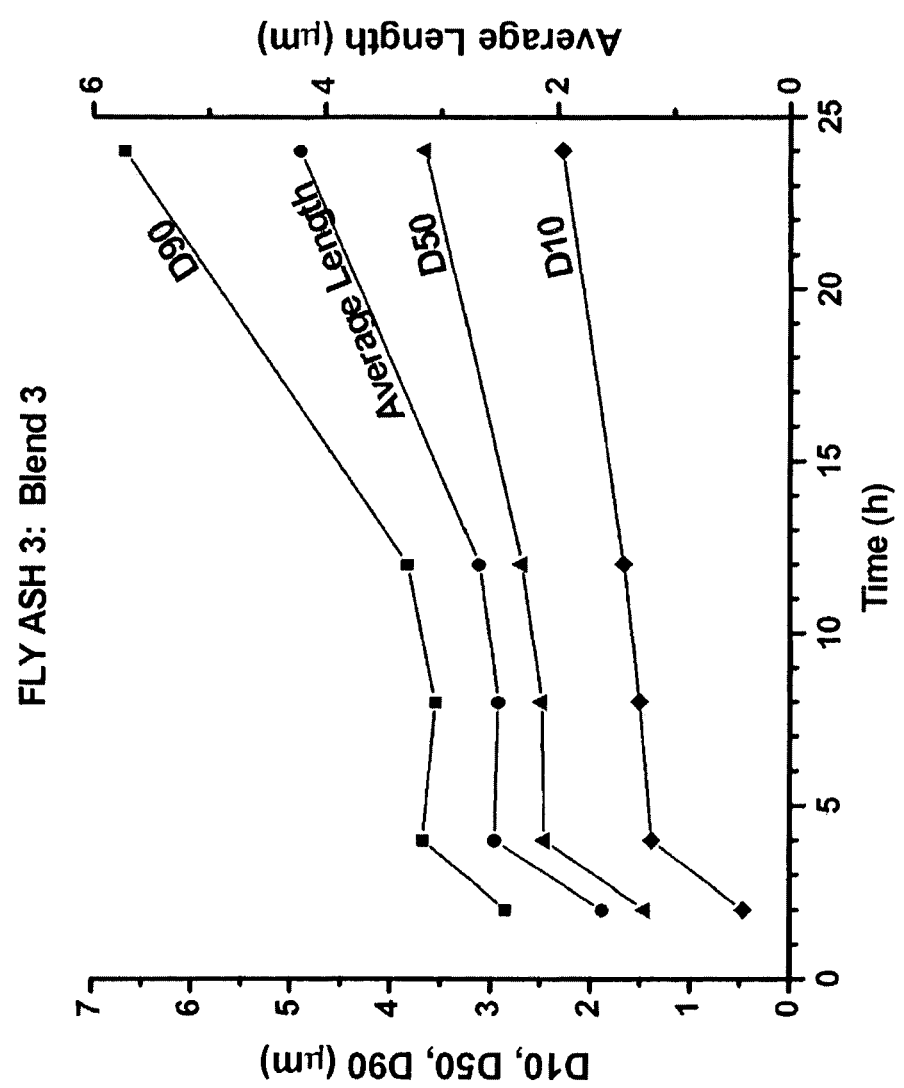
FIG. 15a is a graph of D10, D50, D90 (i.e., 10%, 50%, 90% of total number of fibres, respectively) and average length as a function of heating time to 24 hours at 1500° C., as extracted from Data Set 5 (70/30 fly ash/alumina blend 3)
Figure 15B:
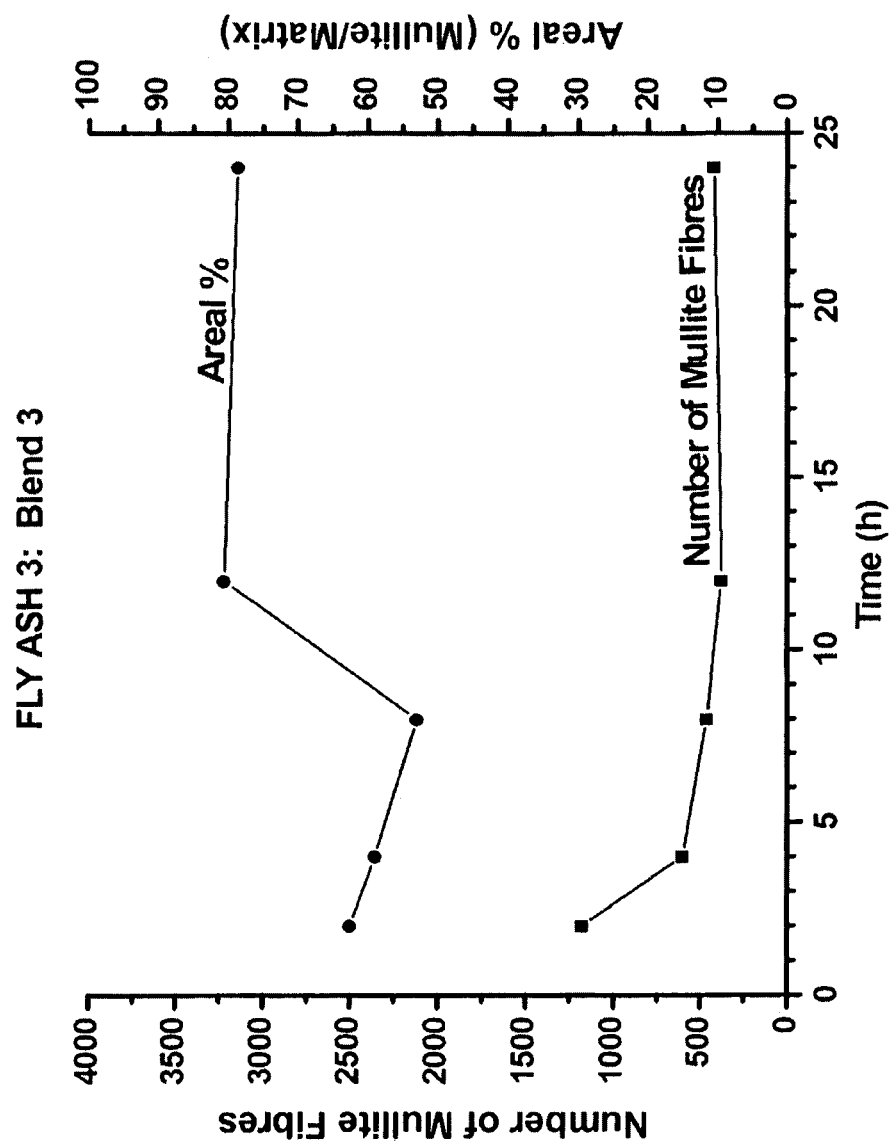
FIG. 15b is a graph of the number of fibres and areal distribution of fibres (%) as a function of heating time to 24 hours at 1500° C., as extracted from Data Set 5 (blend 3).
Figure 15C:
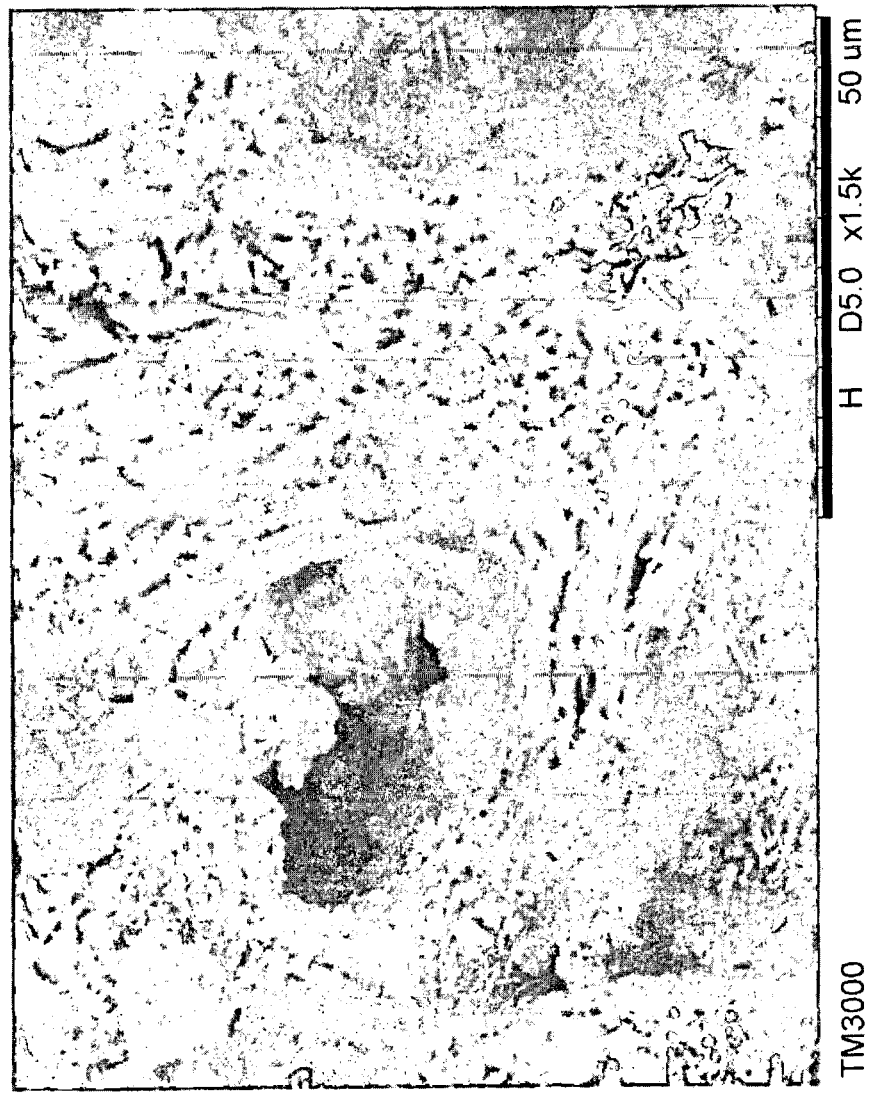
FIG. 15c is a scanning electron microscope (SEM) image of blend 3 (polished and etched) after heat treatment for 2 hours at 1500° C.
Figure 15D:
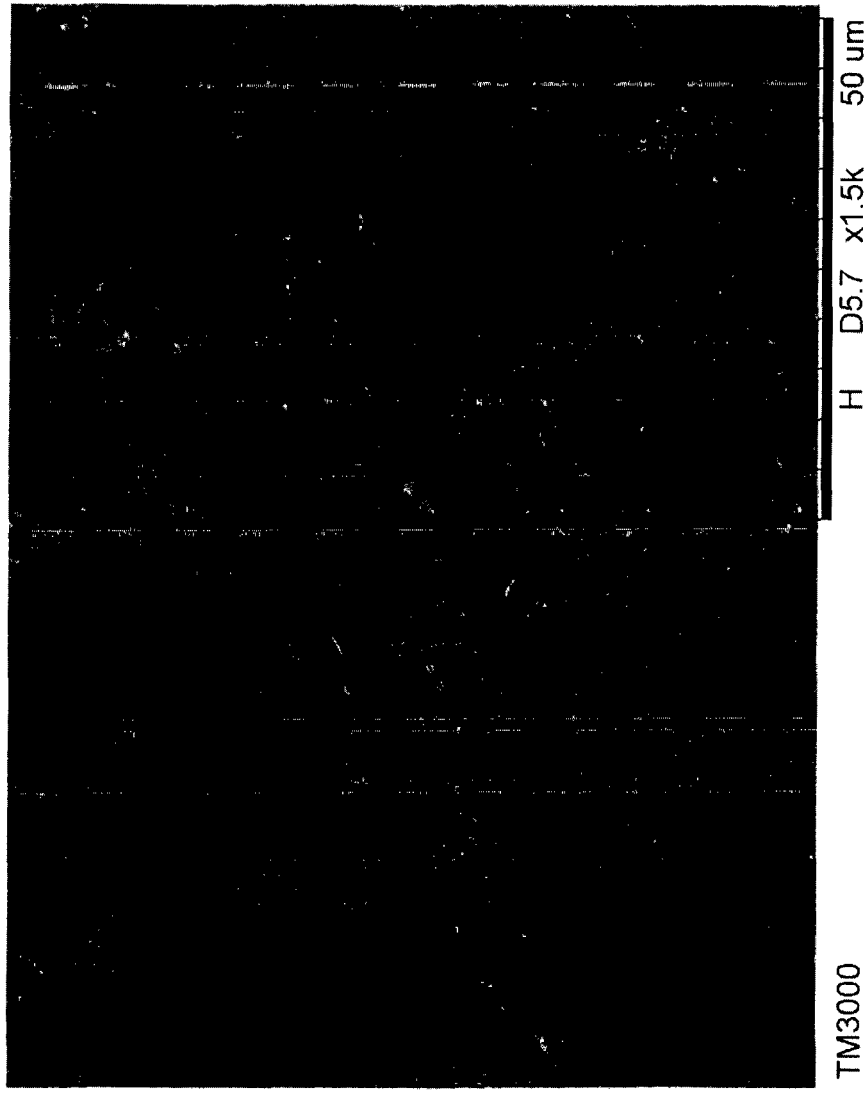
FIG. 15d is an SEM image of blend 3 (polished and etched) after heat treatment for 4 hours at 1500° C.
Figure 15E:
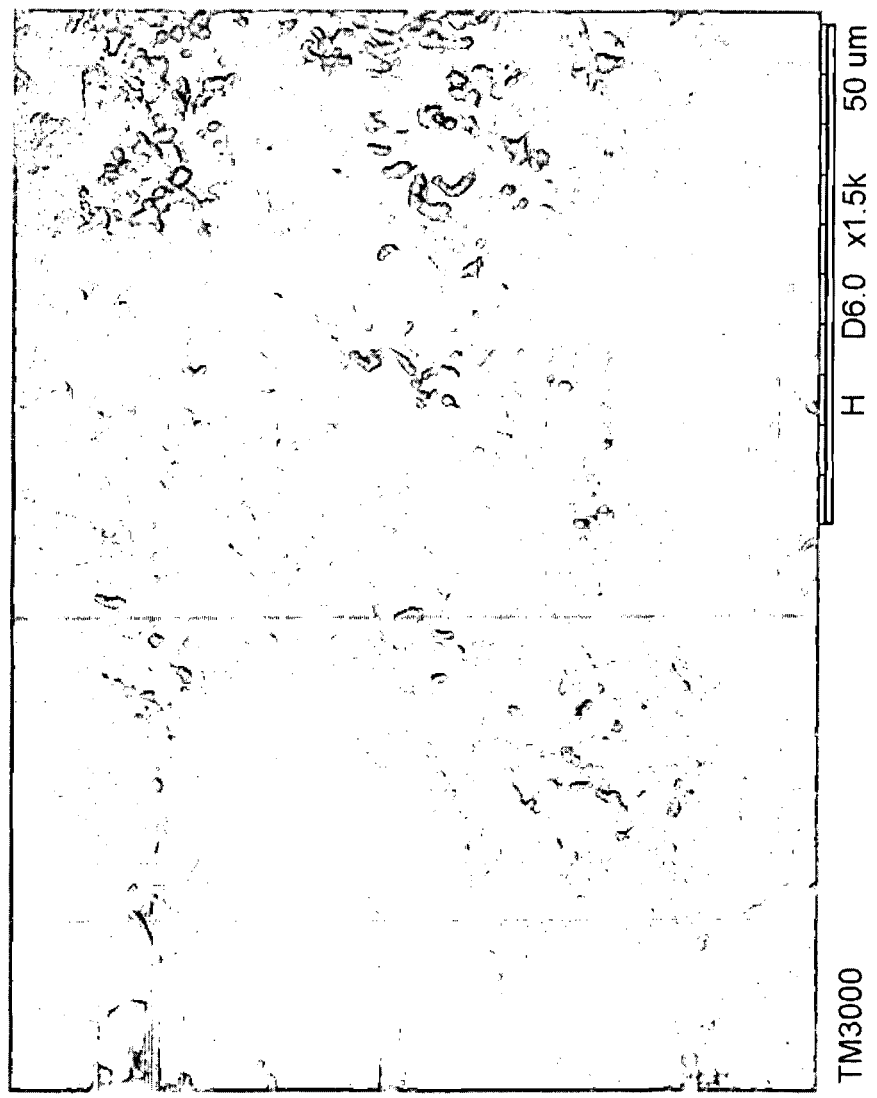
FIG. 15e is an SEM image of blend 3 (polished and etched) after heat treatment for 8 hours at 1500° C.
Figure 15F:
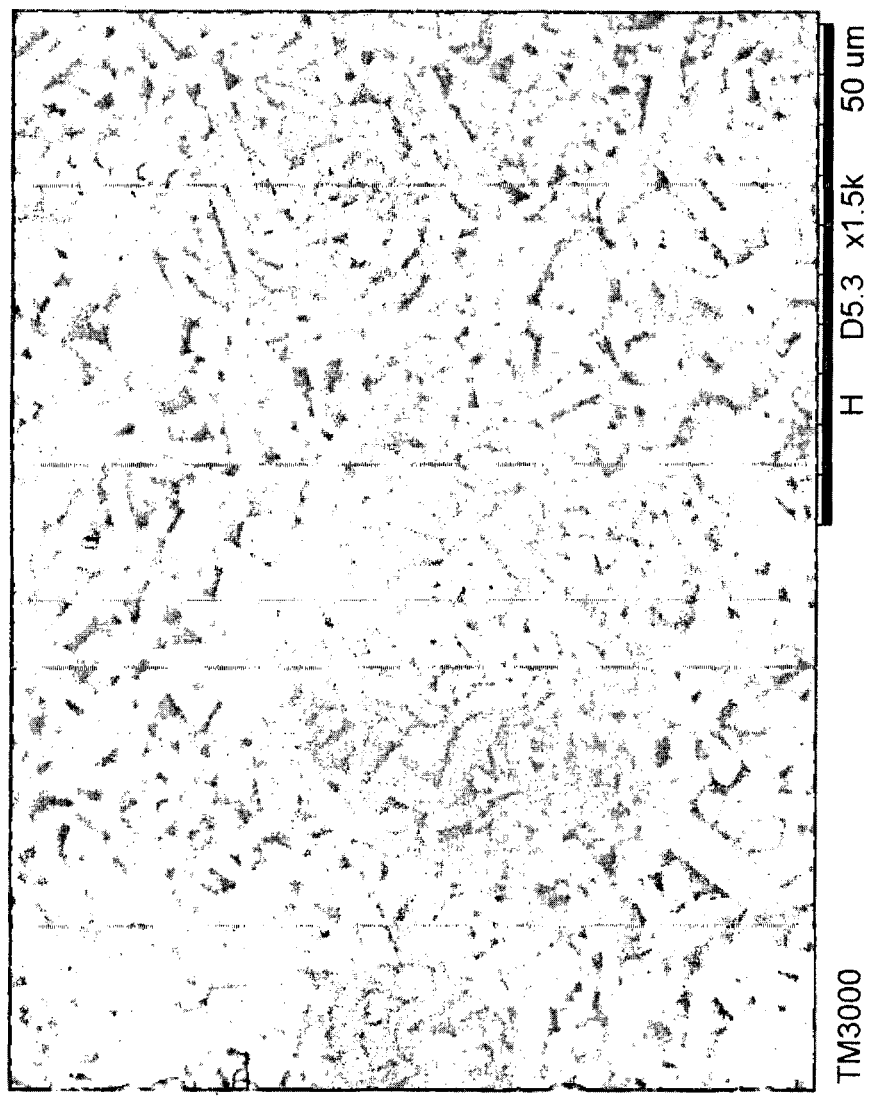
FIG. 15f is an SEM image of blend 3 (polished and etched) after heat treatment for 24 hours at 1500° C.
Figure 16A:
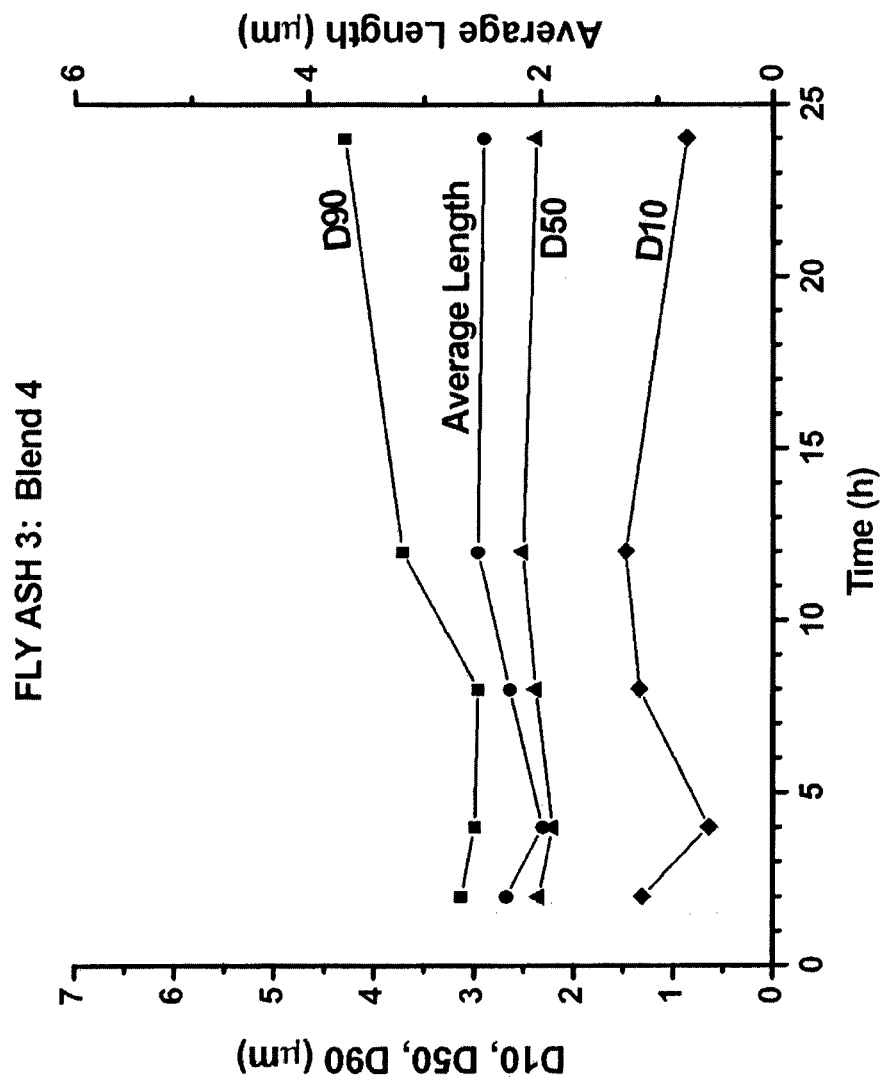
FIG. 16a is a graph of D10, D50, D90 (i.e., 10%, 50%, 90% of total number of fibres, respectively) and average length as a function of heating time to 24 hours at 1500° C., as extracted from Data Set 6 (60/40 fly ash/alumina blend 4)
Figure 16B:
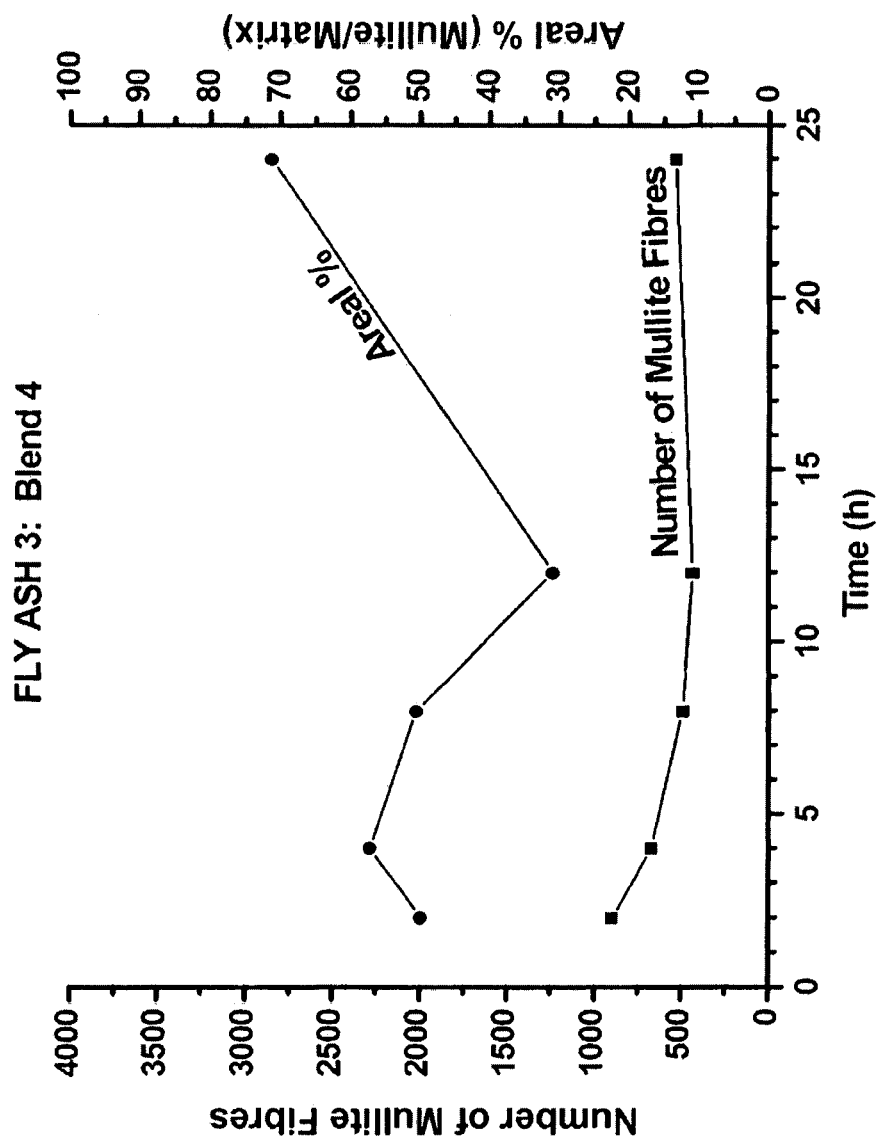
FIG. 16b is a graph of the number of fibres and areal distribution of fibres (%) as a function of heating time to 24 hours at 1500° C., as extracted from Data Set 6 (blend 4).
Figure 16C:
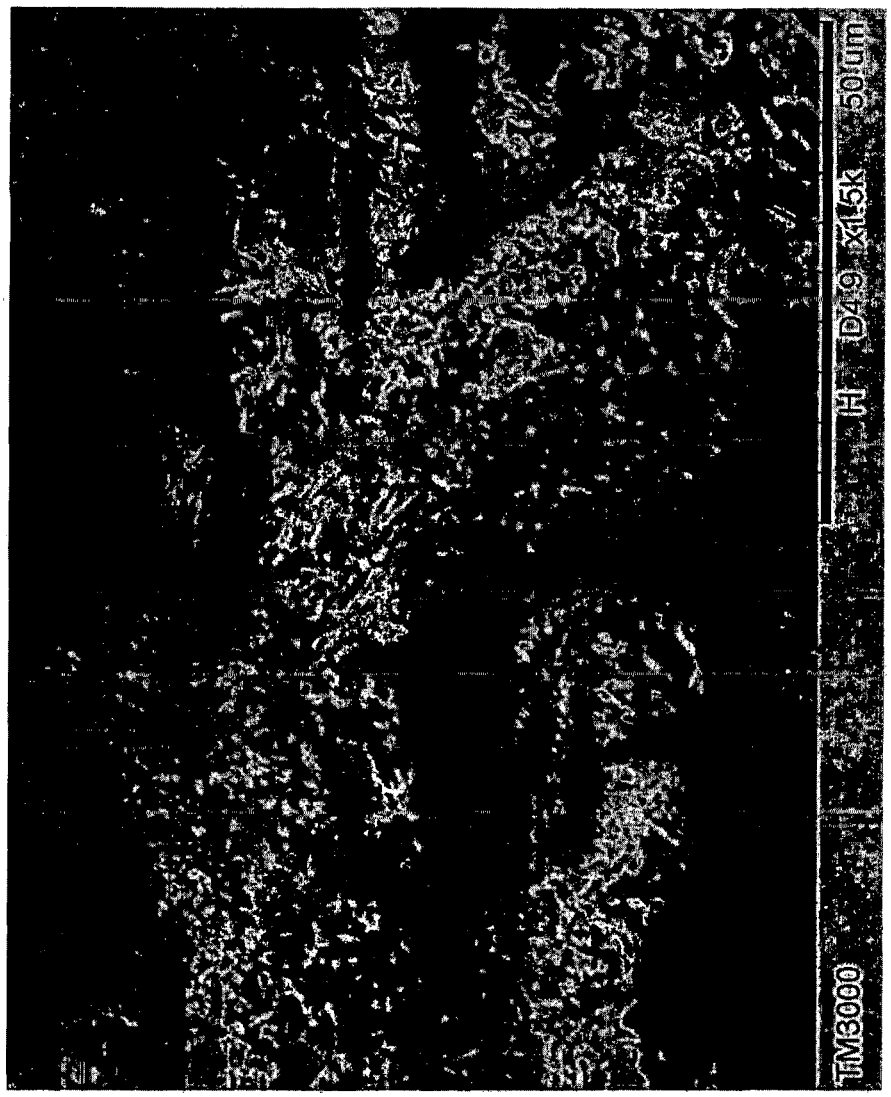
FIG. 16c is a scanning electron microscope (SEM) image of blend 4 (polished and etched) after heat treatment for 2 hours at 1500° C.
Figure 16D:
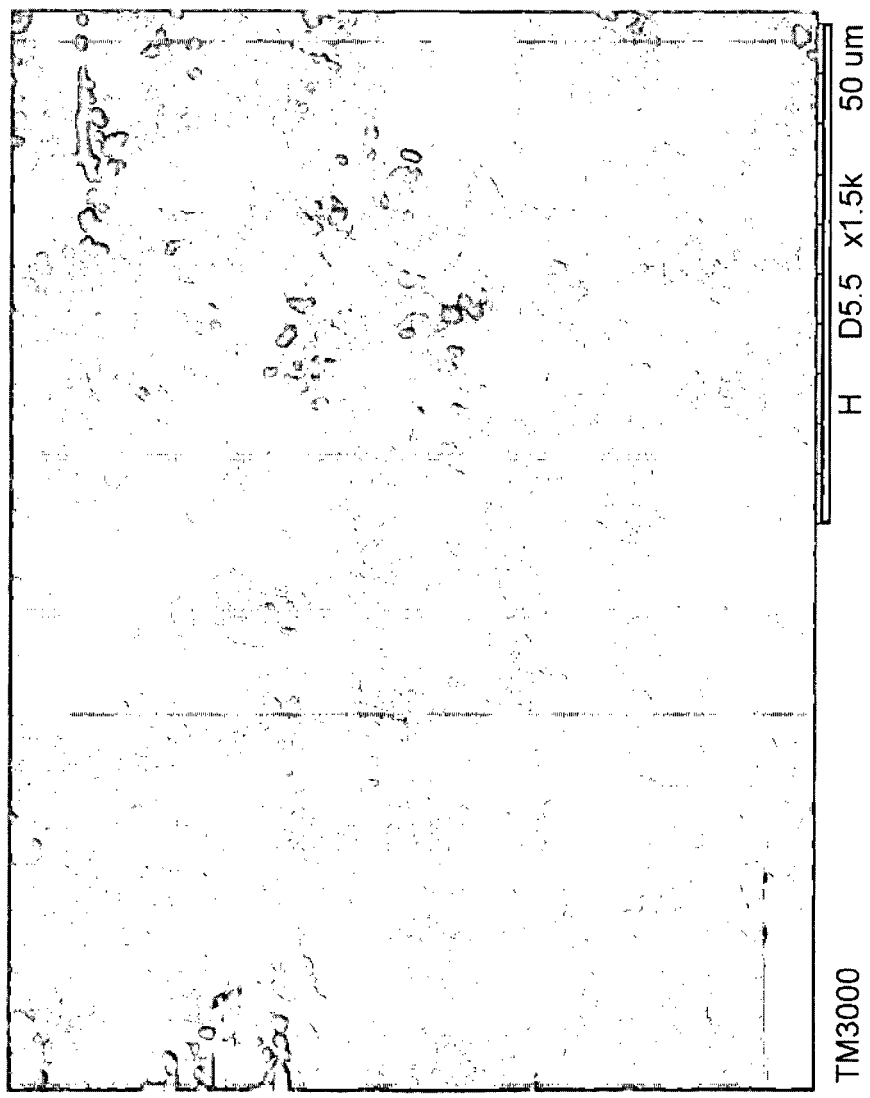
FIG. 16d is an SEM image of blend 4 (polished and etched) after heat treatment for 4 hours at 1500° C.
Figure 16E:
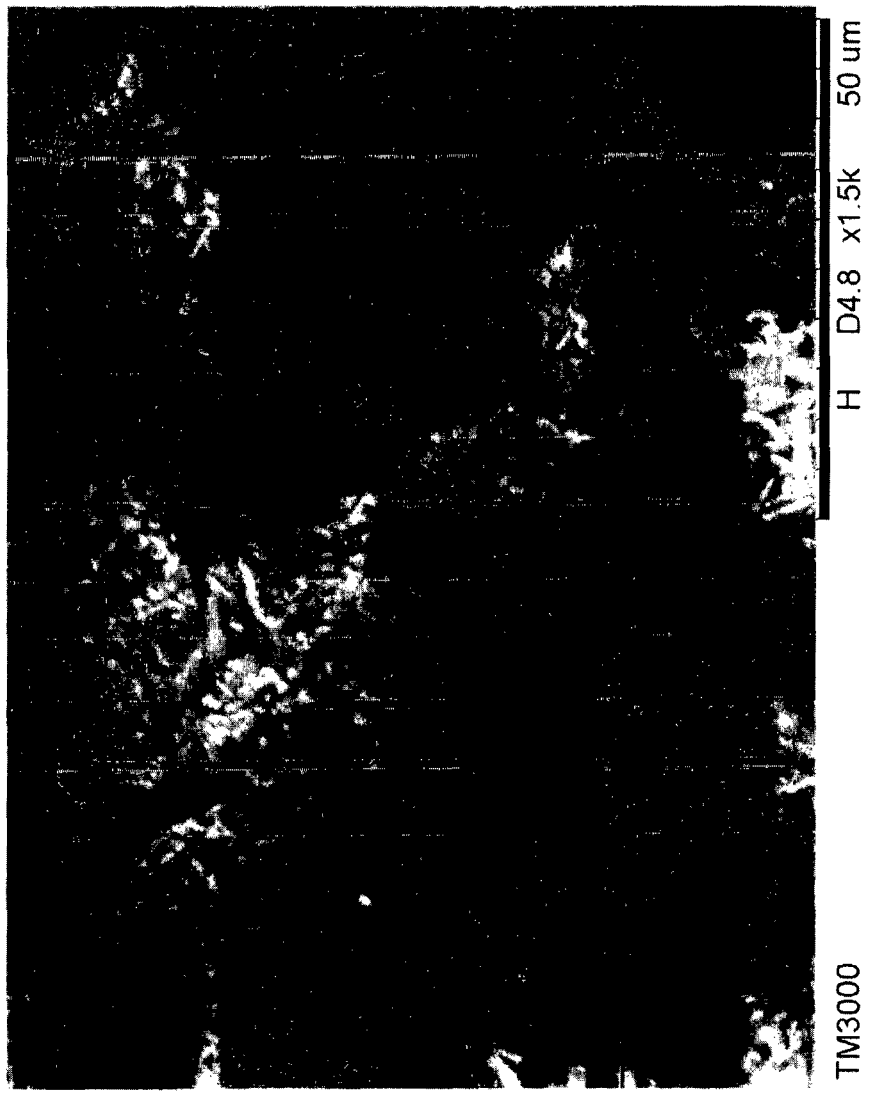
FIG. 16e is an SEM image of blend 4 (polished and etched) after heat treatment for 8 hours at 1500° C.
Figure 16F:
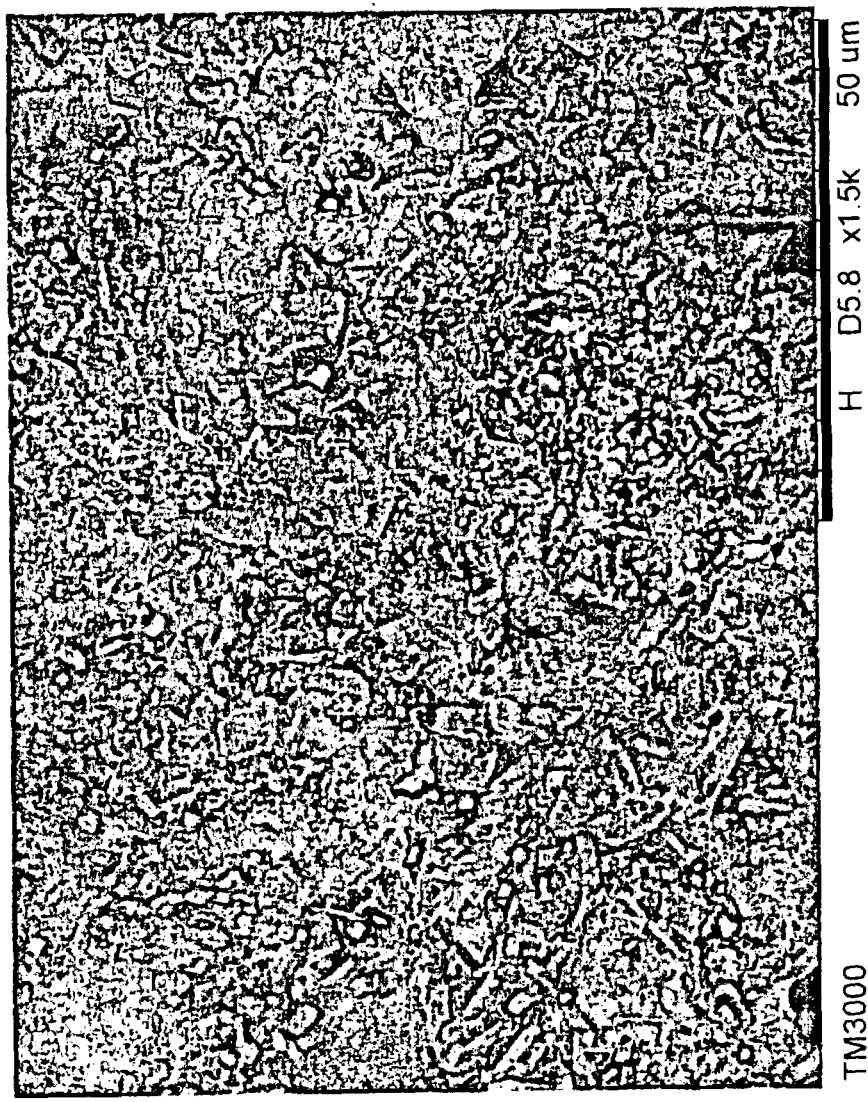
FIG. 16f is an SEM image of blend 4 (polished and etched) after heat treatment for 24 hours at 1500° C.
Figure 17A:
FIG. 17a is an SEM image of fly ash 3 with 2.0 wt % iron oxide (haematite, $Fe_2O_3$) added as a flux and mullite fibre growth modifier (polished and etched) after heat treatment for 2 h at 1500° C.
Figure 17B:
FIG. 17b is an SEM image of fly ash/alumina blend 1 (90/10) with 10 wt % iron oxide (haematite, $Fe_2O_3$) added as a flux and mullite fibre growth modifier (polished and etched) after heat treatment for 2 h at 1500° C.
Figure 17C:
FIG. 17c is an SEM image of fly ash/alumina blend 2 (80/20) with 2.0 wt % iron oxide (haematite, $Fe_2O_3$) added as a flux and mullite fibre growth modifier (polished and etched) after heat treatment for 2 h at 1500° C.
Figure 17D:
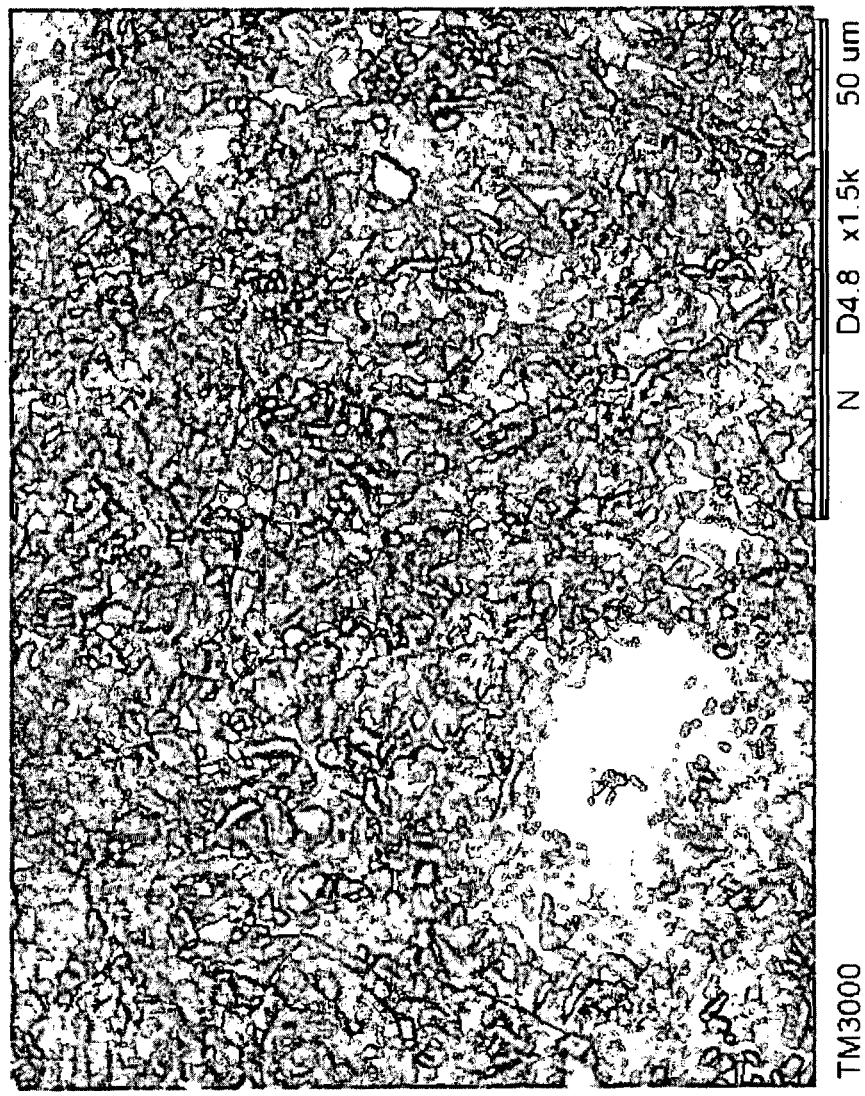
FIG. 17d is an SEM image of fly ash/alumina blend 3 (70/30) with 2.0 wt % iron oxide (haematite, $Fe_2O_3$) added as a flux and mullite fibre growth modifier (polished and etched) after heat treatment for 2 h at 1500° C.
Figure 17E:
FIG. 17e is an SEM image of fly ash/alumina blend 4 (60/40) with 2.0 wt % iron oxide (haematite, $Fe_2O_3$) added as a flux and mullite fibre growth modifier (polished and etched) after heat treatment for 2 h at 1500° C.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including" and not "consisting only of". Variations of the word "comprising", such as "comprise" and "comprises", have correspondingly varied meanings.

The methods described herein produce bulk and other forms of mullite having a "percolated" microstructure. The term "percolated" refers to a completely or effectively completely continuous and interconnected microstructure, scaffold, or network that extends through the entire body, is direct-bonded (thereby excluding glass from between the mullite grains), and consequently is structurally stable such that it resists high-temperature deformation up to, in principle, the melting point (or decomposition temperature) of mullite (1850° C.).

The mullite microstructure may include glass dispersed within the interstices of the percolated matrix. However, any residual glass affects the properties of the percolated mullite in specific and limited ways. As the mullite fibres have grown directly together and interconnected (without an interlayer of glass between the fibres), the percolated mullite may behave effectively as if it were a pure crystalline material despite the presence of "contaminants", such as the residual glass. However, the residual glass phase also may form an independent interconnected network. Some thermomechanical properties, such as creep, may be dominated effectively by the continuous mullite matrix and the material shows extraordinary resistance to creep at temperatures of at least 1500° C. and possibly as high as 1850° C. (the melting point and decomposition temperature of mullite). In contrast, some thermomechanical properties, such as thermal shock, may be dominated effectively by the degree of continuity of the glass network. This type of microstructure is known as a 3-3 composite, where each phase is continuous in three dimensions. In such cases, this undesired effect can be avoided or negated by modifying the composition to reduce the amount of glass and/or, alternatively, heating for sufficient temperature and/or time in order to facilitate grain growth, grain coarsening, reduction in glass content (by chemical incorporation in the growing mullite), physical segregation of the residual glass, and void formation. This type of microstructure is known as a 0-3 composite, where the glass phase is isolated in individual regions not in mutual contact and the mullite is retained as a three-dimensional continuous network. This microstructure has the advantage that the glass has effectively no effect on any thermomechanical properties, including thermal shock.

This contrasts with prior art mullite formation in ceramic products, especially refractories, wherein residual glass is relied upon to bond the mullite grains together. Conventional mullite refractories soften at approximately 1200° C. due to the presence of this residual intergranular glass. In other products, such as porcelain, such mullite fibres are known to form but, in such products, mullite percolation occurs only in localised regions of the material. In the examples of the present invention, mullite percolation is intended to and has been shown to occur throughout the entire body.

For the presently described methods, a range of aluminosilicate starting materials can be used and, advantageously, contaminants such as fluxing agents do not need to be removed. However, the methods of the present invention are sensitive to the alumina:silica ratio and the presence of fluxing impurities, such as oxides and/or salts of alkalies; alkaline earths; transition metals, in particular, iron oxides; semimetals, metalloids, and/or lanthanides; halogens also may be suitable fluxes.

In contrast with the present invention, most prior studies using similar materials to produce mullite aimed to achieve a mullite composition ($3Al_2O_3.2SiO_2$ [3:2 mullite: ~72:28 wt % alumina:silica]). These studies did not attempt to produce 2:1 mullite ($2Al_2O_3.SiO_2$, ~77:23 wt % alumina:silica), which also is a potential compositional limit. The present invention counter-intuitively uses aluminosilicate compositions containing silica contents greater than that of stoichiometric mullite (3:2, which brackets the 2:1 ratio). Higher proportions of silica and/or the presence of fluxes control the amount and properties, in particular, the viscosity, of the glass. The properties of the glass during heating are critical as they facilitate three phenomena that contribute to the generation of the aforementioned microstructures. These phenomena are (1) softening of the glass, which initially facilitates particle rearrangement and densification; (2) concomitant enhanced chemical diffusion of aluminium and silicon ions (by mass transfer), which accelerates mullite fibre growth; and (3) later viscous deformation of the glass, (viz., being a deformable medium), thereby allowing and not hindering the volumetric growth of the mullite fibres. To lower further the glass softening or glass transition temperature and thus encourage mullite fibre growth, potentially at lower temperatures, the composition also may include fluxes as described previously.

This approach is contrary to conventional approaches for mullite formation in refractories and some other products, wherein the glass content often is sought to be reduced. It also is contrary to conventional approaches to the formation of porcelain and some other products, wherein the glass content is balanced between densification (requiring high content) and deformation (requiring low content).

For the presently described methods, starting raw materials can include inexpensive precursors in the form of waste products, such as coal fly ashes, bottom ashes from furnaces and incinerators, and municipal ashes from incinerators. The inventors have found that coal fly ashes have variable alumina:silica ratios but that essentially all fly ashes have ratios with silica contents greater than that of stoichiometric mullite (3:2 and 2:1). This enables fly ashes alone or fly ashes with added vitrification aids and/or other types of compositional modifiers to be used as the raw materials for production.

Other naturally occurring raw materials may be suitable for the production of percolated mullite owing to their having compositions broadly similar to those of fly ashes. Such raw materials include kyanite, sillimanite, andalusite, topaz, pyrophyllite, clays, and/or other aluminosilicate minerals with alumina:silica ratios containing excess silica relative to stoichiometric mullite (3:2 and 2:1).

To obtain percolated mullite from fly ash, the inventors have found that it is sufficient to heat pure fly ashes to approximately 1500° C. for some fly ashes and lower temperatures (particularly 1400° C.) for others for a period of approximately 4 hours, although this can vary depending on the alumina:silica ratio and types and amount of fluxes present in the fly ash. It may be noted that the term "pure" refers to fly ashes containing intrinsic (fluxing) impurities; no fluxes have been added. The addition of some fluxes appears to lower the time required for percolation to a degree sufficient to prevent further shrinkage to 2 hours. Further, some pure fly ashes show percolation in only 2 hours at 1400° C. or at 1500° C. Fly ashes with high intrinsic levels of fluxes and those with added vitrification aids (viz., fluxes) are expected to produce percolated mullite at lower temperatures.

In preparing a starting composition, alumina sources may include bauxite (high-alumina raw material), aluminium hydrates (which may comprise the majority component of bauxite), calcined alumina, and/or red mud (waste product from aluminium processing; this also contains high contents of iron oxide, which is a flux.

Potential aluminosilicate sources for mullite growth may include mullite, kyanite, sillimanite, andalusite, topaz, pyrophyllite, clays (such as kaolinite or illite [which includes iron oxide as a flux], pyrophyllite, phyllite-schist, saprolite-clay, kyanite-staurolite, anorthosite, syenite, emery rock, and other naturally occurred aluminosilicate raw materials high in alumina.

The growth of mullite fibres in fly ashes during heat treatment is enhanced by the near-universal presence of pre-existing mullite grains. To enhance further the growth of mullite fibres, ex situ materials that contain and/or form mullite during heating may be added to the starting composition. For example, mullite-containing and/or mullite-forming materials could be mixed with the fly ash before heating.

It will be appreciated that conventional prior art methods for the production of many mullite-based products typically require either uncontaminated precursor material or the addition of other ingredients (additional alumina or silica) in seeking to bring the starting composition as close as possible to the starting compositions required to produce pure 3:2 mullite as recorded in the literature (72:28 wt % alumina:silica).

It also will be appreciated that conventional prior art methods for porcelain production also typically require either highly pure precursor materials and careful control of the composition (containing potassia, alumina, and silica) in seeking to bring the starting composition as close as possible to the starting compositions that achieve the requisite balance between densification and deformation.

The methods described herein allow use of a vitreous and/or partially vitreous raw material, potentially containing fluxes and other undesirable components and in undesirable contents, to produce a mullite product whose thermomechanical properties can be prevented from being adversely affected by residual glass.

Furthermore, the heat treatment temperature and time (enhancing glass softening, chemical diffusion, and viscous deformation) and composition (by adjusting the alumina:silica ratio and/or adding a flux or fluxes) can be adjusted to generate microstructures whose characteristics are dominated by the continuous mullite matrix. For example, the inventors have shown this using multiple commercially available forms of coal fly ash.

In the presently described methods, mullite fibres grow to the point of percolation, at which point they form a rigid skeleton whereby some or all of the thermomechanical properties are not affected by the presence of the residual glass. Direct grain-to-grain bonding between the mullite fibres allows the exclusion of the glass from between the grains (fibres) in the final product (glass normally is required to assist in conventional mullite densification) and thus eliminates the potential deleterious high-temperature effects of glass (i.e., through softening).

The presently described methods are applicable to both sintered shapes and fuse-cast shapes (using a mould). In the former case, the process requires suitable composition-temperature-time conditions such that the mullite network is able to be established (partially or completely) and thus resist viscous deformation and consequent loss of shape. The principal determinator of this behaviour is the glass viscosity, which must be sufficiently high to retain the shape but sufficiently low to enhance chemical diffusion (to increase the mullite content).

The presently described methods provide a microstructurally stable mullite material that is resistant to high-temperature shrinkage and deformation, to which effectively all conventional aluminosilicate products are subject and so consequently deteriorate during prolonged heating. The produced percolated mullite can be a highly dense or porous product capable of achieving uniquely superior thermomechanical properties.

In addition to its most apparent use as a refractory shape, the percolated mullite produced may be used as a refractory castable, refractory ramming mix, refractory crucible, refractory setter, refractory tube, refractory plate, refractory grain, refractory aggregate, kiln shelving, kiln post, heat shield, fibre blanket, fibre board, fibre shape, fuse-cast shape, corrosion-resistant shape, coating, whiteware, sanitaryware, dinnerware, wear-resistant tile, military armour, proppant, corrosion-resistant shape, glass-ceramic (crystallised glass), filter, electrical insulator, electronic substrate, catalyst, and/or, inter alia, infrared-transmitting window.

As would be appreciated from the above the inventors have obtained the conditions (materials, composition, temperature, and time) that result in the formation of a ceramic body consisting of percolated and direct-bonded (grain-to-grain) mullite that may extend throughout an entire body of material, with residual glass (and possibly crystalline phases) in the volume between the mullite.

This method includes the step of heating a body of material having a composition that incorporates the chemical system consisting of aluminium oxide (alumina) and silicon dioxide (silica) and other possible components, wherein the composition includes an alumina:silica wt % ratio of from ~10:90 to ~77:23 (normalised to exclude non-alumina and non-silica impurities).

For example, the composition includes an alumina:silica wt % ratio (normalised to exclude non-alumina and non-silica impurities) of:
from approximately 10:90 to approximately 77:23
from approximately 10:90 to approximately 75:25
from approximately 10:90 to approximately 70:30
from approximately 10:90 to approximately 65:35
from approximately 10:90 to approximately 60:40
from approximately 10:90 to approximately 55:45
from approximately 10:90 to approximately 50:50
from approximately 10:90 to approximately 45:55
from approximately 10:90 to approximately 40:60
from approximately 10:90 to approximately 35:65
from approximately 10:90 to approximately 30:70
from approximately 10:90 to approximately 25:75
from approximately 10:90 to approximately 20:80
from approximately 10:90 to approximately 15:85

As would be appreciated by a person skilled in the art, the composition may include pre-existing mullite and/or glass. Alternatively, the composition may not contain pre-existing mullite and/or glass but mullite and/or glass may form upon heating at high temperatures.

In addition, glass and/or mullite may be added to the composition before or during heating.

In addition, materials that form mullite upon heating may be added.

The composition also may include fluxes to encourage softening of the glass (and/or to enhance liquid formation otherwise) and/or lower the temperature and/or time required for the formation of the percolated mullite. Fluxes may include, for example, oxides and/salts of alkalies, alkaline earths, transition metals, semimetals, metalloids, and/or lanthanides; halogens also may be suitable fluxes.

The composition is heated to a temperature for a period of time sufficient to soften the glass component (typically above the glass transition temperature), encourage rapid chemical diffusion through the softened glass, and allow physical expansion of the mullite fibres into the yielding residual glass.

The inventors have found that particularly suitable starting compositions may include or be comprised principally of fly ash. Other particularly suitable compositions include a mixture of fly ash and aluminous raw materials (for example, alumina, bauxite, and/or aluminium hydrates) or, alternatively include fly ash, aluminous raw material(s) and a flux or fluxes (for example oxides and/or salts of alkalies, alkaline earths, transition metals, semimetals, metalloids, and/or lanthanides); halogens also may be suitable fluxes.

As would be appreciated the method is not limited to starting compositions including fly ash. The composition of the body of material to be heated may include one or more materials that form mullite on heating. Such materials may be naturally occurring raw materials, naturally occurring crystalline raw materials, and/or synthetic raw materials.

For example, the composition may include one or more of kyanite, sillimanite, andalusite, topaz, pyrophyllite, clay, and/or other aluminosilicate minerals. Other particular example compositions may include a mixture of bauxite and quartz (sand, sandstone, quartzite, ganister, etc.); mixtures of aluminium oxide (alumina) and silicon dioxide (silica); and mixtures of mullite, bauxite and quartz.

The method may include sintering without a mould in which case, the composition is typically heated to a temperature of a minimum of ~1400° C. and a maximum ~1600° C., preferably at least ~1500° C. For fly ashes and other compositions that are silica-rich relative to the mullite composition (viz., compositions containing >23 wt % $SiO_2$), the appropriate heating temperature is dictated principally by the following interdependent variables: (a) flux content, (b) alumina:silica wt % ratio, (c) pre-existing mullite:glass ratio, and (d) pre-existing quartz content.

It would be appreciated by a person skilled in the art that the time condition commensurate with the temperature being used must be sufficient to achieve nucleation and/or grain growth of the mullite in order the achieve percolation such that the mullite network is continuous throughout the body. For sintering without a mould, the composition is heated to a temperature of a minimum of ~1400° C. and a maximum of ~1600° C., preferably at least ~1500° C. for a minimal time of ~1 h, preferably ~4 h, and more preferably ~8 h.

The microstructural network may be formed principally of what is known as a 3-3 composite, where both the mullite and residual glass form mutually interpenetrating 3-dimensional networks. The mullite is direct-bonded and so there is no glass between the mullite grains. This microstructure consists of a mullite volume content (relative to the total mullite+glass content) of <90-95%. When sintering without a mould to achieve such a microstructure, the composition is heated to a temperature preferably of at least ~1500° C. for a maximal time of ~8 h.

The microstructure network alternatively may be formed principally of what is known as a 0-3 composite, where the mullite forms a 3-dimensional network and the residual glass is isolated in individual regions not in mutual contact. The mullite is direct-bonded and so there is no glass between the mullite grains. This microstructure consists of a mullite volume content (relative to the total mullite+glass content) of ≥90-95%. For sintering without a mould to achieve such a microstructure, the composition is heated to a temperature preferably of at least ~1500° C. for a minimal time of ~8 h. This may result in grain growth, grain coarsening, reduction in glass content, physical segregation of the residual glass, and void formation.

Residual glass may be removed from the fully percolated microstructure by leaching with a suitable solvent, such as hydrofluoric acid (HF), thereby resulting in a porous and rigid scaffold of mullite whiskers, fibres, and/or equiaxed mullite.

The method also may include fuse-casting in a mould, wherein the composition is heated to temperature sufficient to allow rapid liquid flow. As would be appreciated, the minimal temperature depends on the composition but the maximal temperature is 1850° C.

It will be appreciated that, in contrast to prior art mullite formation, the present method provides percolated and direct-bonded mullite throughout the entire body produced in accordance with any one of the methods described above.

It also will be appreciated that the starting composition may be modified in order to avoid the intention of forming of mullite directly but to lead to the formation of other aluminosilicate products. For example, suitable addition levels of a material based on magnesium oxide (periclase, MgO) may be added such that the formation of magnesium aluminosilicate (cordierite, $2MgO.2Al_2O_3.5SiO_2$) is favoured; similarly, a form of sodium oxide (soda, $Na_2O$) may be added to form sodium aluminosilicate (nepheline, $Na_2O.Al_2O_3.2SiO_2$). Many other aluminosilicates can be produced by this method. Optional embodiments of the present invention also may be said to consist broadly in the parts, elements, and features referred to or indicated herein, individually or collectively, in any or all combinations of two or more of the parts, elements, and/or features, and wherein specific integers are mentioned herein that have known equivalents in the art to which the invention relates, such known equivalents are deemed to be incorporated herein as if individually set forth.

Although a preferred embodiment has been described in detail, it should be understood that various changes, substitutions, and/or alterations can be made by one of ordinary skill in the art without departing from the scope of the present invention.

It will be appreciated that various forms of the invention may be used individually or in combination.

EXAMPLES

The inventors have shown that a highly dense and thermomechanically stable mullite can recrystallise and/or form from fly ash (a waste product of coal combustion) by heat treatment at ≥1500° C. for ≥4 hours. In other cases, with fly ashes of lower alumina:silica ratios and/or the presence of fluxes (instrinsic or extrinsic), the temperature and/or time can be reduced (e.g., ≥1400° C. and ≥2 hours). The inventors also have shown that lower temperatures and shorter times are possible, depending on the nature of the fly ash and additions, if any. The resultant microstructures are unique in that (1) the fibrous mullite grains form a continuous skeleton (percolate) throughout the body and (2) the grains bond directly to one another in the absence of intergranular glass. Owing to the unique completely percolated microstructure of direct mullite-to-mullite bonding (derived counter-intuitively since the raw materials from which the product is made are vitreous or partially vitreous), this material exhibits high-temperature thermomechanical stability at temperatures ≥1500° C. (possibly as high as 1850° C., the melting point or decomposition temperature of mullite).

Several fly ashes were examined having varying alumina/silica wt % ratios:

| | Effect on Shrinkage | | | | |
|---|---|---|---|---|---|
| Fly Ash | Decrease $Al_2O_3/SiO_2$ (wt %) | Increase Fluxes (wt %) | Decrease Mullite/Glass | Decrease Quartz | Increase LOI (wt %) |
| 1 | 48/52 | 5.0 | High | Low | 25.0 |
| 2 | 24/76 | 1.5 | Low | High | 2.1 |
| 3 | 24/76 | 2.1 | Medium | Medium | 2.4 |
| 4 | 30/70 | 7.0 | Medium | Medium | 0.9 |
| 5 | 28/72 | 4.5 | Medium | Medium | 2.9 |
| 6 | 40/60 | 7.8 | High | Low | 5.5 |
| 7 | 40/60 | 10.7 | High | Low | 1.0 |
| 8 | 48/52 | 6.9 | High | Low | 17.2 |
| 9 | 34/66 | 12.5 | Medium | Medium | 6.3 |
| 10 | 37/63 | 11.6 | High | Low | 4.9 |
| 11 | 26/74 | 4.7 | Medium | Medium | 2.7 |
| 12 | 38/62 | 9.9 | High | Low | 11.3 |

The claims defining the invention are as follows:

1. A method of producing percolated mullite in a body of material, the method including the step of heating the body of material at a temperature in the range of from 1400° C. to 1600° C. for at least 2 hours, wherein the body of material has a composition that includes alumina and silica, and the weight percent ratio of alumina:silica is from 10:90 to 60:40 when normalized to exclude non-alumina and non-silica impurities.

2. A method as claimed in claim 1, wherein the body includes pre-existing mullite, and/or a pre-existing glass component.

3. A method as claimed in claim 1, wherein the composition includes at least one flux.

4. A method as claimed in claim 3, wherein the at least one flux is an oxide and/or salt of an alkali, alkaline earth, transition metal or lanthanide, or a semimetal oxide, metalloid oxide, or a halogen.

5. A method as claimed in claim 1, wherein the composition of the body includes a naturally occurring raw material and/or a synthetic raw material capable of forming mullite when heated.

6. A method as claimed in claim 1, wherein the body is comprised principally of fly ash, bottom ash, municipal ash, bagasse ash or rise husk ash, or mixtures thereof.

7. A method as claimed in claim 1, wherein the composition of the body includes one or more materials selected from the group consisting of fly ash, bottom ash, municipal ash, bagasse ash, rise hush ash, mullite, kyanite, sillimanite, andalusite, topaz, pyrophyllite, clays, phyllite-schist, saprolite clay, kyanite-staurolite, anorthosite, syenite, emery rock, other aluminosilicates, bauxite, alumina, aluminium hydrates, and red mud.

8. A method as claimed in claim 1, wherein the body is heated at a temperature in the range of from 1400° C. and to 1600° C. for at least 8 hours.

9. A method as claimed in claim 1, wherein the body is heated at a temperature of at least 1500° C.

10. Percolated mullite produced in accordance with the method of claim 1.

11. A method as claimed in claim 1, wherein the weight percent ratio of alumina:silica is from 10:90 to 55:45.

12. A method as claimed in claim 1, wherein the weight percent ratio of alumina:silica is from 10:90 to 35:65.

13. A method as claimed in claim 1, wherein the weight percent ratio of alumina:silica is from 10:90 to 30:70.

14. A body of material including a percolated mullite microstructure formed of a continuous or effectively continuous interconnected scaffold or network of direct-bonded mullite grains, the direct bonded mullite grains being such that glass is excluded from between the grains, wherein the percolated mullite microstructure extends continuously and substantially throughout the entire body.

15. A body of material as claimed in claim 14, wherein the material is a principally 3-3 composite, with mullite and glass forming mutually interpenetrating 3-dimensional networks.

16. A body of material as claimed in claim 14, wherein the material is a principally 0-3 composite, wherein the mullite forms a 3-dimensional network and residual glass is isolated in individual regions not in mutual contact.

17. A body of material as claimed in claim 15, wherein the microstructure consists of a mullite volume content relative to the total mullite and glass content of less than 95%.

18. A body of material as claimed in claim 17, wherein the microstructure consists of a mullite volume content relative to the total mullite and glass content of less than 90%.

19. A body of material as claimed in claim 16, wherein the microstructure consists of a mullite volume content, relative to the total mullite and glass content of greater than or equal to 90%.

20. A body of material as claimed in claim 19, wherein the microstructure consists of a mullite volume content, relative to the total mullite and glass content of greater than or equal to 95%.

21. A method of producing percolated mullite in a body of material, the method including the step of heating the body of material, wherein the body of material has a composition that includes alumina and silica, and the weight percent ratio of alumina:silica is from 24:76 to 48:52 when normalized to exclude non-alumina and non-silica impurities.

22. A method of producing percolated mullite in a body of material, the method including the step of heating the body of material, wherein the body of material has a composition that includes alumina and silica, and the weight percent ratio of alumina:silica is from 10:90 to 65:35 when normalized to exclude non-alumina and non-silica impurities, and wherein the body includes pre-existing mullite.

23. A method of producing percolated mullite in a body of material, the method including the step of heating the body of material, wherein the body of material has a composition that includes alumina and silica, and the weight percent ratio of alumina:silica is from 10:90 to 65:35 when normalized to exclude non-alumina and non-silica impurities, and wherein the body includes a pre-existing glass component.

24. A method of producing percolated mullite in a body of material, the method including the step of heating the body of material, wherein the body of material has a composition that includes alumina and silica, and the weight percent ratio of alumina:silica is from 10:90 to 65:35 when normalized to exclude non-alumina and non-silica impurities, and wherein the body is comprised principally of fly ash, bottom ash, municipal ash, bagasse ash, rice husk ash, or mixtures thereof.

* * * * *